(12) United States Patent
Wang et al.

(10) Patent No.: US 12,331,966 B1
(45) Date of Patent: Jun. 17, 2025

(54) ELECTRIC LITHIUM BROMIDE ABSORPTION AIR CONDITIONING UNIT AND ENERGY STORAGE REFRIGERATION AND HEATING SYSTEM

(71) Applicants: Miaohong Wang, Qinhuangdao (CN); Quanling Wang, Qinhuangdao (CN)

(72) Inventors: Miaohong Wang, Qinhuangdao (CN); Quanling Wang, Qinhuangdao (CN)

(*) Notice: Subject to any disclaimer, the term of this patent is extended or adjusted under 35 U.S.C. 154(b) by 0 days.

(21) Appl. No.: 18/984,916

(22) Filed: Dec. 17, 2024

(30) Foreign Application Priority Data

Jan. 26, 2024 (CN) .......................... 202410117392.3

(51) Int. Cl.
*F25B 15/00* (2006.01)
*F25B 15/06* (2006.01)

(52) U.S. Cl.
CPC ........ *F25B 15/06* (2013.01); *F25B 2315/007* (2013.01); *F25B 2400/01* (2013.01)

(58) Field of Classification Search
CPC .................................. F25B 15/06; F24H 1/185
See application file for complete search history.

(56) References Cited

U.S. PATENT DOCUMENTS

| | | | | |
|---|---|---|---|---|
| 2,687,023 | A * | 8/1954 | Herndon, Jr. ........... | F25B 39/02 62/503 |
| 4,329,851 | A * | 5/1982 | Bourne ................. | F25B 49/043 62/235.1 |
| 6,742,347 | B1 * | 6/2004 | Kolk ........................ | G05B 5/01 700/44 |
| 2003/0167790 | A1 * | 9/2003 | Koike ..................... | F25B 15/04 62/476 |
| 2019/0264579 | A1 * | 8/2019 | Steiner .................... | F01K 3/006 |
| 2019/0360728 | A1 * | 11/2019 | Hatoya .................. | C09K 5/047 |
| 2021/0148612 | A1 * | 5/2021 | Hong ................. | B23K 11/0073 |

FOREIGN PATENT DOCUMENTS

| CN | 204678565 U | 9/2015 |
|---|---|---|
| CN | 110762896 A | 2/2020 |

* cited by examiner

*Primary Examiner* — Brian M King

(57) ABSTRACT

An electric lithium bromide absorption air conditioning unit and an energy storage refrigeration and heating system, including an electric lithium bromide absorption air conditioning unit and an electric heat storage device; the electric lithium bromide absorption air refrigeration unit comprises an electric heat generator; the electric heat generator comprises an electric heating device and/or an heat storage and heat exchanging device, and a grid power supply; the electric heating storage device comprises a heat storing and exchanging tank; the electric heating device is connected to the grid power supply. The generator used is an electric heating-type heat generator. By utilizing lithium bromide, it disrupts the conventional refrigeration compression cycle air conditioning system to address the global warming issue. This system can also give rise to independent energy storage cooling or heating solutions for grid-side energy storage projects, helping to solve the energy storage issues on the grid user side.

12 Claims, 14 Drawing Sheets

ELECTRIC LITHIUM BROMIDE ABSORPTION AIR CONDITIONING UNIT AND ENERGY STORAGE REFRIGERATION AND HEATING SYSTEM

CROSS REFERENCE TO RELATED APPLICATIONS

This application claims foreign priority of Chinese Patent Application No. 2024101173923, filed on Jan. 26, 2024 in the China National Intellectual Property Administration, the disclosures of all of which are hereby incorporated by reference.

TECHNICAL FIELD

The present disclosure relates to the technical field of lithium bromide absorption refrigeration unit, in particular to an electric lithium bromide absorption air conditioning unit and an energy storage refrigeration and heating system.

BACKGROUND

Both domestic and international lithium bromide absorption refrigeration units are typically powered by steam, hot water, or direct-fired non-electric lithium bromide absorption refrigeration units and heating systems. In the context of the global carbon-neutral strategy, the widespread use of wind and photovoltaic power generation, along with sufficient green electricity, alleviates the natural gas shortages in certain regions, particularly reducing pollution caused by gas-fired systems. In the current global effort to mitigate climate warming, and under the framework of the United Nations Paris Agreement which limits the production and use of hydrofluorocarbon (HFC) refrigerants, the development of electric lithium bromide absorption refrigeration units and their heating systems carries profound environmental significance.

SUMMARY

The present disclosure provides an electric lithium bromide absorption air conditioning unit and an energy storage refrigeration and heating system, to solve the technical problem that existed in existing in existing technologies.

To realize the above objective, the present disclosure provides an electric lithium bromide absorption air conditioning unit and an energy storage refrigeration and heating system, including: an electric lithium bromide absorption air conditioning unit and an electric heat storage device; wherein, the electric lithium bromide absorption air refrigeration unit includes an electric heat generator; and the electric heat generator includes an electric heating device and/or an heat storage and heat exchanging device, and a grid power supply; wherein, the electric heating storage device includes a heat storing and exchanging tank; the electric heating device is connected to the grid power supply, and the energy storage and heat exchanging device is connected to the heat storing and exchanging tank.

Furthermore, the electric lithium bromide absorption air conditioning unit further includes a lithium bromide air conditioning unit body, an electric heat generating cylinder, an electromagnetic induction high frequency generator, the grid power supply, a first electromagnetic induction high frequency current outputting cable, a second electromagnetic induction high frequency current outputting cable, an electromagnetic induction heating coil, the electric heat generator, concentrated lithium bromide solution, a domestic hot water heat exchanger, a heating heat exchanger, a refrigerant steam outputting tube, a cryogenerator, a refrigerant steam spraying device, cryogenerator dilute solution, a condenser, cryogenerator refrigerant water, an absorption heat exchanger, a cryogenerator refrigerant water spraying device, an evaporator, evaporator refrigerant water, an evaporator refrigerant water spray pump, an evaporator refrigerant water spraying device, a concentrated solution outputting pipe, a dilute solution inputting tube, a high temperature heat exchanger, a high temperature primary side heat exchanging rod, a high temperature secondary side heat exchanging rod, a first cooling and heating conversion valve, a second cooling and heating conversion valve, a low temperature heat exchanger, a low temperature heat first heat exchanging rod, low temperature second heat exchanging rod, an absorption liquid outputting pump, absorber dilute solution, a concentrated solution spraying device, a third cooling and heating conversion valve, and first thermal insulation material; and a lower part of the electric heat generating cylinder is provided with the concentrated lithium bromide solution, the domestic hot water heat exchanger, the heating heat exchanger and the refrigerant steam outputting tube are disposed at an upper part of the heat generator; the electric heat generating cylinder is wrapped with the first thermal insulation material, and the first thermal insulation material is externally wrapped with at least one set of the electromagnetic induction heating coil; the electromagnetic induction high frequency generator is connected to the electromagnetic induction heating coil by the first electromagnetic induction high frequency current outputting cable and the second electromagnetic induction high frequency current outputting cable; and the concentrated lithium bromide solution is connected to the concentrated solution spraying device through the high temperature heat exchanger and the high temperature primary side heat exchanging rod; and the first cooling and heating conversion valve are communicated with cryogenerator dilute solution through the low temperature heat exchanger and the low temperature heat first heat exchanging rod; and the refrigerant steam outputting tube is connected to the refrigerant steam spraying device through the third cooling and heating conversion valve and the cryogenerator; the cryogenerator refrigerant water spraying device is connected to the cryogenerator refrigerant water; the evaporator refrigerant water spraying device connects the evaporator refrigerant water through the evaporator refrigerant water spray pump; the absorber dilute solution is divided into two paths through the absorption liquid outputting pump: the absorber dilute solution is communicated with the low temperature generator dilute solution through the low temperature second heat exchanging rod of the low temperature heat exchanger; and the absorber dilute solution is communicated with the concentrated lithium bromide solution through the second cooling and heating conversion valve, the high temperature heat exchanger and the high temperature secondary side heat exchanging rod.

Furthermore, including a resistance electric heating device electric heating tube; the resistance electric heating device electric heating tube is a metal resistance wire heating tube, a ceramic resistance heating tube or a silicon carbide resistance heating device; the resistance electric heating device electric heating tube is disposed within the electric heat generator and immersed in the concentrated lithium bromide solution, and the resistance electric heating device electric heating tube is set below the domestic hot water heat exchanger, heating heat exchanger and the refrigerant steam outputting tube.

Furthermore, the electric heating device includes a carbon fiber electric heating tube; the carbon fiber electric heating tube is disposed in the heat generator and immersed in the concentrated lithium bromide solution, and it is set below the domestic hot water heat exchanger, the heating heat exchanger and the refrigerant steam outputting tube; a carbon fiber heating wire is provided inside the carbon fiber electric heating pipe.

Furthermore, further including an energy storage and heat exchanging device; wherein the energy storage and heat exchanging device is disposed within the electric heat generator and immersed in the concentrated lithium bromide solution; and the energy storage and heat exchanging device is set below the domestic hot water heat exchanger, the heating heat exchanger and the refrigerant steam outputting tube.

Furthermore, the electric heat storage device includes a heat storage and exchanging tank body, a filling hole, a thermal storage medium heat exchanging tube, a thermal storage medium feeding port, a thermal storage medium, an external lower heat exchanging coil, a heat exchanging medium inputting tube, and a heat exchanging medium outputting tube; wherein, the thermal storage medium is provided inside the heat storage and exchanging tank, the thermal storage medium feeding port is set above the filling hole; the thermal storage medium is water, oil, molten salt, liquid metal or rock sand; and at least one or more circles of the external heat exchanging coil is arranged outside the thermal storage medium heat exchanging tube, the external heat exchanging coil and the thermal storage medium heat exchanging tube form a close contacting outputting heat exchanger, the external heat exchanging coil is connected to the heat circulation medium through the heat exchanging medium inputting pipe and the heat exchanging medium outputting tube, and the heat of the thermal storage medium is outputting through the heat circulation medium.

Furthermore, the electric heat storage device including the heat storage and exchange transfer tank, the filling hole, the thermal storage medium feeding port, the thermal storage medium, a tank atmospheric pressure breathing interface, the heat exchanging medium inputting pipe, the heat exchanging medium outputting pipe, and a built-in upper heat exchanging coil; wherein, at least one or more circles of the built-in upper heat exchanging coil is immersed in the thermal storage medium or suspended above the thermal storage medium, the heat exchanging medium inputting pipe and the heat exchanging medium outputting pipe are fixed above the filling hole or the heat storage and exchanging tank body.

Furthermore, the electric heat storage device includes the heat storage and exchanging tank body, the filling hole, the thermal storage medium feeding port, the thermal storage medium, the tank atmospheric pressure breathing interface, the heat exchanging medium inputting pipe, the heat exchanging medium outputting pipe, a built-in lower heat exchanging coil, a breathing valve, a thermal storage medium discharge plate; at least one or more circles of the built-in lower heat exchanging coil is immersed in the thermal storage medium, the heat exchanging medium inputting pipe and the heat exchanging medium outputting pipe are disposed above the heat exchanging cartridge or the thermal storage medium discharge blocking plate; the breathing valve is disposed above the tank atmospheric pressure breathing interface and connected with the heat storage and exchanging tank body.

Furthermore, the electric heat storage device includes the heat storage and exchanging tank body, the filling hole, the thermal storage medium feeding port, the thermal storage medium, the tank atmospheric pressure breathing interface, the heat exchanging medium inputting pipe, the heat exchanging medium outputting pipe, a built-in lower heat exchanging coil, a breathing valve, a thermal storage medium discharge plate; at least one or more circles of the built-in lower heat exchanging coil is immersed in the thermal storage medium, the heat exchanging medium inputting pipe and the heat exchanging medium outputting pipe are disposed above the heat exchanging cartridge or the thermal storage medium discharge blocking plate; the breathing valve is disposed above the tank atmospheric pressure breathing interface and connected with the heat storage and exchanging tank body.

Furthermore, the electric heat storage device includes the heat storage and exchanging tank body, the filling hole, the thermal storage medium feeding port, the thermal storage medium, the tank atmospheric pressure breathing interface, the heat exchanging medium inputting pipe, the heat exchanging medium outputting pipe, an external upper heat exchanging coil, and the breathing valve; at least one or more circles of the external upper heat exchanging coil, or at least one or more rings of the external upper heat exchanging coil are disposed outside the heat storage and exchanging tank body.

Furthermore, the electric heat storage device includes heat storing and exchanging tank, the filling hole, the thermal storage medium heat exchanging tube, the thermal storage medium feeding port, the thermal storage medium, the tank atmospheric pressure breathing interface, the external lower heat exchanging coil, the heat exchanging medium inputting tube, the heat exchanging medium outputting tube, the breathing valve, a second thermal insulation material, at least one set of electromagnetic induction heating coil, a first electromagnetic induction coil lead, and a second electromagnetic induction coil lead; and the second thermal insulation material is uniformly wrapped on the outer surfaces of the heat storing and exchanging tank, the external lower heat exchanging coil, the heat exchanging medium inputting pipe and the heat exchanging medium; the electromagnetic induction heating coil is wound around the outside of the second thermal insulation material.

Furthermore, the electric heat storage device includes the heat storing and exchanging tank, the filling hole, thermal storage medium, the thermal storage medium feeding port, the thermal storage medium, the tank atmospheric pressure breathing interface, the external lower heat exchanging coil, the heat exchanging medium inputting tube, the heat exchanging medium outputting tube, the breathing valve, the second insulation material, a carbon fiber heating tube, a quartz glass tube, and a carbon fiber heating wire; wherein, the carbon fiber heating tube is disposed in the heat storing and exchanging tank body and immersed in the thermal storage medium.

Furthermore, the electric heat storage device includes the heat storing and exchanging tank, the filling hole, the thermal storage medium heat feeding port, the thermal storage medium, an observing mirror, the tank atmospheric pressure breathing interface, the external lower heat exchanging coil, the heat exchanging medium inputting pipe, the heat exchanging medium outputting pipe, the breathing valve, a nitrogen tank, and nitrogen; wherein, the breathing valve is connected to the heat storage and exchanging tank body through the tank atmospheric pressure breathing interface, and connected with the thermal storage medium; an end of the breathing valve is communicated with air, another end of the breathing valve is connected with the nitrogen tank and communicated with the nitrogen; the observing mirror is disposed on the heat storage and exchanging tank body or the filling hole, and configured to observe the location of the thermal storage medium.

Furthermore, the electric heat storage device includes heat storage heat exchanging tank, filling manhole, thermal storage medium heat exchanging tube, thermal storage medium feeding port, thermal storage medium, observing mirror, tank atmospheric pressure breathing interface, external heat exchanging coil, heat exchanging medium inputting pipe, the heat exchanging medium outputting pipe, the breathing valve, a silicone breathing apparatus, a silica gel color glass cover, an oil seal glass, a breathing hole, and silica gel; wherein, the silicone breathing apparatus is connected to the heat storage and exchanging tank through the tank atmospheric pressure breathing interface, and communicated with the thermal storage medium; the silicone breathing apparatus is provided with the silicone, the thermal storage medium is communicated with the air through the breathing hole, and passed through the silica gel and the oil sealing glass and the, serving as a breathing channel of the heat storage heat exchanging tank.

Furthermore, including electromagnetic induction high frequency generator, the grid power supply, a first electromagnetic induction high frequency current outputting interface, a second electromagnetic induction high frequency current outputting interface, a first electromagnetic induction high frequency current outputting cable, a second electromagnetic induction high frequency current outputting cable, the energy storage and heat exchanging device, the heat storage heat exchanging tank, the external lower heat exchanging coil, a heat exchanging and inputting interface, a heat exchanging and outputting interface, the electromagnetic induction heating coil, a heat storage circulating pump, a fourth energy storage cooling and heating conversion valve, a fifth energy storage cooling and heating conversion valve, a sixth energy storage cooling and heating changing valve, a seventh energy storage cooling and heating conversion valve, a eighth energy storage cooling and heating conversion valve, a ninth energy storage cooling and heating conversion valve; wherein, an end of the energy storage and heat exchanging device is connected with the heating outputting valve, another end is connected to an end of the external lower heat exchanging coil through the heat storage circulating pump and the heat exchanging and inputting interface; and the other end of the external lower heat exchanging coil is connected to the energy storage and heating device through the fifth energy storage cooling and heating conversion valve and an inputting interface of the energy storage and heat exchanging device; and an other end is connected with an energy storage cooling and heating inputting interface through the seventh energy storage cooling and heating conversion valve and eighth energy storage cooling and heating conversion valve; and one end of the electromagnetic induction coil is connected with the electromagnetic induction high frequency generator by the first electromagnetic induction coil lead and the second electromagnetic induction high frequency current outputting cable, and passing through a first power connecting terminal of an electromagnetic induction heating controller and the second electromagnetic induction high frequency current outputting interface; and another end of the electromagnetic induction coil is connected with the electromagnetic induction high frequency generator by the first electromagnetic induction high frequency current outputting cable, and passing through the second electromagnetic induction coil lead and the electromagnetic induction high frequency current outputting interface; and the electromagnetic induction high frequency generator is connected to the grid power supply.

Furthermore, including grid power supply, the energy storage and heat exchanging device, the heat storage heat exchanging tank, the external lower heat exchanging coil, the carbon fiber heating pipe, the carbon fiber heating wire, a first power supply terminal, a second power supply terminal, and the heat storage circulating pump; wherein, the carbon fiber heating wire of the carbon fiber heating pipe is connected to the grid power supply through the first power supply terminal and the second power supply terminal; and the external lower heat exchanging coil of the heat storage heat exchanging tank is connected to the energy storage heating heat exchanger, through the heat exchanging and inputting interface, the heat exchanging and outputting interface and the heat exchanging circulating pump.

Beneficial effects are as following.

In order to ensure that the global temperature increase within ° C., countries around the world should restrict and ultimately replace the HFC refrigerants, which is a culprit of greenhouse gas. Lithium bromide is friendly to the environment, so great efforts should be made to develop lithium bromide absorption air conditioning units, fulfilling the responsibility to curb global climate change and making the necessary contributions.

Electric lithium bromide absorption air conditioning units have led to energy storage projects on the grid-user side. These projects have much higher initial investment, energy storage efficiency, and economic benefits are higher than pumped storage or compressed air energy storage power generation projects.

During the summer, air conditioning for cooling is a major electricity consumer, and the increasing global warming causes frequent electricity shortages due to high demand for air conditioning. In winter, heating is also the largest electricity consumer. If electric lithium bromide absorption air conditioning units and their energy storage-based cooling and heating systems are applied, they can not only address the above-mentioned electricity shortages but also reduce the investment pressure on the building of grid expansion. Additionally, they can help users save on operating costs for air conditioning in the summer and heating in the winter.

BRIEF DESCRIPTION OF THE DRAWINGS

In order to illustrate the specific embodiments of the present disclosure more clearly, the accompanying drawings of the specific embodiments will be briefly introduced below. It is obvious that the accompanying drawings described below are some embodiments of the present disclosure. For those skilled in the art, other drawings can be obtained based on these without requiring any inventive effort.

Figure 1:
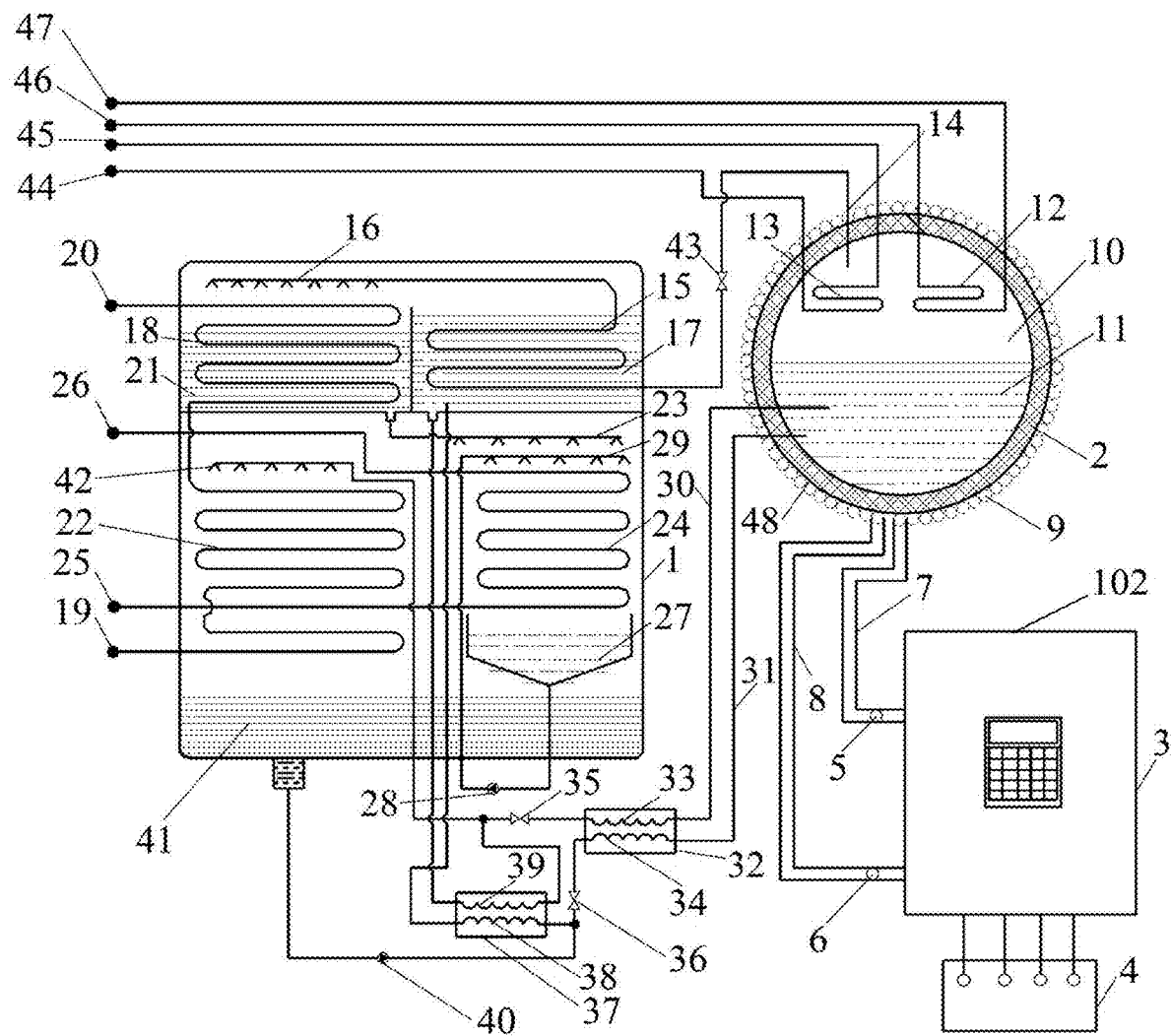
FIG. 1 is a schematic structural diagram of an electric lithium bromide absorption air conditioning unit with electromagnetic induction heating according to an embodiment of the present disclosure.

LABELS AND DESCRIPTION 1 lithium bromide absorption air conditioning body, 2 electric heat generating cylinder, 3 electromagnetic induction high frequency generator, 4 grid power supply, 5 first electromagnetic induction high frequency current outputting interface, 6 second electromagnetic induction high frequency current outputting interface, 7 first electromagnetic induction high frequency current outputting cable, 8 second electromagnetic induction high frequency current outputting cable, 9 electromagnetic induction heating coil, 10 electric heat generator, 11 concentrated lithium bromide solution, 12 domestic hot water heat exchanger, 13 heating heat exchanger, 14 refrigerant steam outputting tube, 15 cryogenerator, 16 refrigerant steam spraying device, 17 cryogenerator dilute solution, 18 condenser, 19 cooling water inlet, 20 cooling water outlet, 21 cryogenerator refrigerant water, 22 absorption heat exchanger, 23 cryogenerator refrigerant water spraying device, 24 evaporator, 25 cooling water inlet interface, 26 cooling water outlet interface, 27 evaporator refrigerant water, 28 evaporator refrigerant water spray pump, 29 evaporator refrigerant water spraying device, 30 concentrated solution outputting pipe, 31 dilute solution inputting tube, 32 high temperature heat exchanger, 33 high temperature primary side heat exchanging rod, 34 high temperature secondary side heat exchanging rod, 35 first cooling and heating conversion valve, 36 second cooling and heating conversion valve, 37 low temperature heat exchanger, 38 low temperature heat first heat exchanging rod, 39 low temperature second heat exchanging rod, 40 absorption liquid outputting pump, 41 absorber dilute solution, 42 concentrated solution spraying device, 43 third cooling and heating conversion valve, 44 energy storage cooling and heating inputting interface, 45 heating outputting valve, 46 domestic hot water output interface, 47 domestic hot water inlet interface, 48 first thermal insulation material, 49 resistance electric heating device electric heating tube, 50 carbon fiber electric heating tube, 51 carbon fiber heating wire, 52 third power supply terminal, 53 fourth power supply terminal, 54 energy storage and heat exchanging device, 55 inputting interface of the energy storage and heat exchanging device, 56 outputting interface of the energy storage and heat exchanging device, 57 heat storing and exchanging tank, 58 filling hole, 59 thermal storage medium heat exchanging tube, 60 thermal storage medium feeding port, 61 thermal storage medium, 62 observing mirror, 63 tank atmospheric pressure breathing interface, 64 external lower heat exchanging coil, 65 heat exchanging medium inputting tube, 66 heat exchanging medium outputting tube, 67 heat exchanging and inputting interface, 68 heat exchanging and outputting interface, 69 thermal storage tank bracket, 70 built-in upper heat exchanging coil, 71 built-in lower heat exchanging coil, 72 breathing valve, 73 thermal storage medium discharge blocking plate, 74 second thermal insulation material, 75 electromagnetic induction heating coil, 76 first electromagnetic induction coil lead, 77 second electromagnetic induction coil lead, 78 first power connecting terminal, 79 second power connecting terminal, 80 carbon fiber heating tube, 81 quartz glass tube, 82 carbon fiber heating wire, 83 first power supply terminal, 84 second power supply terminal, 85 external upper heat exchanging coil, 86 nitrogen tank, 87 nitrogen, 88 value, 89 nitrogen interface, 90 heat storage circulating pump, 91 fourth energy storage cooling and heating conversion valve, 92 a fifth energy storage cooling and heating conversion valve, 93 sixth energy storage cooling and heating changing valve, 94 a seventh energy storage cooling and heating conversion valve, 95 a eighth energy storage cooling and heating conversion valve, 96 a ninth energy storage cooling and heating conversion valve, 97 silicone breathing apparatus, 98 silica gel color glass cover, 99 oil seal glass, 100 breathing hole, 101 silica gel.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

In the description of the present disclosure, it should be understood that the terms "center", "longitudinal", "transverse", "length", "width", "thickness", "up", "down", "front", "rear", "left", "right", "vertical", "horizontal", "top", "bottom", "inner", "outer", "clockwise," "counterclockwise" and other directional or positional relationships refer to the orientations or positions based on the figures provided. These terms are used solely for the convenience of describing the disclosure and simplifying the description, and are not meant to indicate or imply that the device or component referred to must have a specific orientation, structure, or operation. Therefore, they should not be construed as limitations of the present disclosure.

Additionally, the terms "first" and "second" are used only for descriptive purposes and should not be understood to indicate or imply relative importance or the quantity of the technical features indicated. Thus, features described as "first" or "second" may explicitly or implicitly include one or more such features. In the description of the present disclosure, the term "plurality" means two or more, unless otherwise specifically defined. Moreover, the terms "mounting", "connecting" and "coupling" should be broadly interpreted. For example, they may refer to either fixed connections, detachable connections, or integral connections; mechanical connections or electrical connections; direct connections or connections through intermediate media; or internal communications between two components. For those skilled in the art, the specific meaning of these terms in the context of the present disclosure can be understood based on the specific circumstances.

This embodiment provides an electric lithium bromide absorption air conditioning unit and an energy storage refrigeration and heating system, including an electric lithium bromide absorption air conditioning unit and an electric heat storage device. The electric lithium bromide absorption air refrigeration unit includes an electric heat generator 10. the electric heat generator 10 includes an electric heating device 102 and/or a heat storage and heat exchanging device 54, and a grid power supply 4.

The electric heating storage device includes a heat storing and exchanging tank 57. the electric heating device is connected to the grid power supply 4, and the energy storage and heat exchanging device 54 is connected to the heat storing and exchanging tank 57.

The electromagnetic induction heating lithium bromide absorption air conditioning unit is an electric lithium bromide unit, where the generator adopts an electric heating heat generator. This replaces the conventional steam, hot water, or direct combustion heat sources with electric heating. By adopting lithium bromide, which does not require HFC refrigerants, it disrupts the conventional refrigeration compression cycle air conditioning system to address global warming issues. The electric lithium bromide absorption air conditioning unit and energy storage-based cooling and heating system can also give rise to independent energy storage cooling air conditioning or heating supply grid-side energy storage projects, solving energy storage problems for grid-side users. The thermal storage heat exchanger tank body 57 can store heat by photovoltaic, wind power, or off-peak electricity. This not only solves the issue of integrating wind and solar power into the grid, but the stored thermal energy can also serve as the heat source for the electric heating heat generator 10, reducing the operating costs of the electric heating heat generator 10.

The electric lithium bromide absorption air conditioning unit and an energy storage refrigeration and heating system includes electric lithium bromide absorption air conditioning unit with electromagnetic induction heating. As shown in FIG. 1, the electric lithium bromide absorption air conditioning unit further includes a lithium bromide air conditioning unit body 1, an electric heat generating cylinder 2, an electromagnetic induction high frequency generator 3, the grid power supply 4, a first electromagnetic induction high frequency current outputting cable 7, a second electromagnetic induction high frequency current outputting cable 8, an electromagnetic induction heating coil 9, the electric heat generator 10, concentrated lithium bromide solution 11, a domestic hot water heat exchanger 12, a heating heat exchanger 13, a refrigerant steam outputting tube 14, a cryogenerator 15, a refrigerant steam spraying device 16, cryogenerator dilute solution 17, a condenser 18, cryogenerator refrigerant water 21, an absorption heat exchanger 22, a cryogenerator refrigerant water spraying device 23, an evaporator 24, evaporator refrigerant water 27, an evaporator refrigerant water spray pump 28, an evaporator refrigerant water spraying device 29, a concentrated solution outputting pipe 30, a dilute solution inputting tube 31, a high temperature heat exchanger 32, a high temperature primary side heat exchanging rod 33, a high temperature secondary side heat exchanging rod 34, a first cooling and heating conversion valve 35, a second cooling and heating conversion valve 36, a low temperature heat exchanger 37, a low temperature heat first heat exchanging rod 38, low temperature second heat exchanging rod 39, an absorption liquid outputting pump 40, absorber dilute solution 41, a concentrated solution spraying device 42, a third cooling and heating conversion valve 43, and first thermal insulation material 48.

The main structure of the lithium bromide absorption air conditioning unit described above is similar to existing technologies. Therefore, the detailed connection relationships between its components will not be elaborated further. This disclosure primarily focuses on improvements to the generator heat source. The electromagnetic induction heating lithium bromide absorption air conditioning unit is an electric lithium bromide system, where the generator adopts an electric heating heat generator. This replaces the conventional steam, hot water, or direct combustion heat sources with electric heating. By utilizing lithium bromide, which does not require HFC refrigerants, it disrupts the traditional refrigeration compression cycle air conditioning system to address global warming issues. Additionally, the electric lithium bromide absorption air conditioning unit can give rise to energy storage projects on the grid user side, helping to resolve a series of development issues related to energy storage for grid-side users.

As shown in FIG. 1, a lower part of the electric heat generating cylinder 2 is provided with the concentrated lithium bromide solution 11, the domestic hot water heat exchanger 12, the heating heat exchanger 13 and the refrigerant steam outputting tube 14 are disposed at an upper part of the heat generator 10. The electric heat generating cylinder 2 is wrapped with the first thermal insulation material 48, and the first thermal insulation material 48 is externally wrapped with at least one set of the electromagnetic induction heating coil 9. The electromagnetic induction high frequency generator 3 is connected to the electromagnetic induction heating coil 9 by the first electromagnetic induction high frequency current outputting cable 7 and the second electromagnetic induction high frequency current outputting cable 8. The electromagnetic induction high frequency generator 3 outputs high-frequency current to the electromagnetic induction heating coil 9, and a high-frequency alternating magnetic field is generated around the electromagnetic induction heating coil 9, and magnetic flux lines are created longitudinally within the electromagnetic induction heating coil 9. These magnetic flux lines penetrate the electric heat generating cylinder 2. Since the electric heat generating cylinder 2 is made of iron material, which is a ferromagnetic material, it generates an electric field under the influence of the magnetic field. This induces an eddy current within the electric heat generating cylinder 2, resulting in the formation of a large amount of eddy currents. Due to the fact that the electric heat generating cylinder 2 is made of ferromagnetic material with relatively low resistivity, the eddy currents are strong, generating high-temperature heat. This heat then heats the concentrated lithium bromide solution 11 stored inside the electric heat generating cylinder 2, causing a large amount of water to evaporate from the concentrated lithium bromide solution 11 and further concentrating the solution. The concentrated lithium bromide solution 11 is connected to the concentrated solution spraying device 42 through the high temperature heat exchanger 32 and the high temperature primary side heat exchanging rod 33; and the first cooling and heating conversion valve 35 are communicated with cryogenerator dilute solution 17 through the low temperature heat exchanger 37 and the low temperature heat first heat exchanging rod 38.

The refrigerant steam outputting tube 14 is connected to the refrigerant steam spraying device 16 through the third cooling and heating conversion valve 43 and the cryogenerator 15. The refrigerant vapor is sprayed into the condenser 18, where it is cooled and condensed into cryogenerator refrigerant water 21. This cryogenerator refrigerant water 21 is then output to the cryogenerator refrigerant water spraying device 23 and sprayed onto the evaporator 24. The cryogenerator refrigerant water 21 cools the air conditioning chilled water inside the evaporator 24. The chilled water is then output through the cooling water inlet interface 25 and cooling water outlet interface 26 as air conditioning cooling water. The evaporator refrigerant water spray pump 28 continuously circulates and delivers low-temperature cooling water to the evaporator refrigerant water spraying device 29, evaporator refrigerant water 27 onto the evaporator, which cools the air conditioning cooling water in the fan coil unit. This process cools the air conditioning room, achieving the goal of refrigerated air conditioning.

The concentrated solution spraying device 42 sprays the high-temperature concentrated lithium bromide solution 11 onto the absorption heat exchanger 22, where it absorbs a large amount of evaporator water vapor, diluting the high-temperature concentrated lithium bromide solution 11. The solution then passes through the absorption heat exchanger 22, absorbing the heat carried away by the condenser. The resulting absorber dilute solution 41 is divided into two output paths by the absorption liquid output pump 40. One path flows through the low temperature heat exchanger 37's low temperature second heat exchanging rod 39, providing the cryogenerator 15 with the cryogenerator dilute solution 17 it needs. The other path flows through the second cooling and heating conversion valve 36, passes through the high temperature heat exchanger 32, and is delivered to the electric heating heat generator's electric heat generating cylinder 2 via the high temperature secondary side heat exchanging rod 34 to concentrate the concentrated lithium bromide solution 11, repeating the heating process that forms the concentrated lithium bromide solution 11.

During the heating process of the electric heating heat generator casing 2, large amounts of high-temperature steam heat the heating water in the heating supply heat exchanger 13, which is then supplied to the fan coil unit through the heating supply input interface 44 and heating supply output interface 45, providing heating hot water to the air-conditioned room, thus achieving winter heating operation.

During the heating process of the electric heat generating cylinder 2, large amounts of high-temperature steam heat the domestic hot water heat exchanger 12. The heated water is then supplied through the domestic hot water output interface 46 and domestic hot water input interface 47 to provide domestic hot water.

Figure 2:
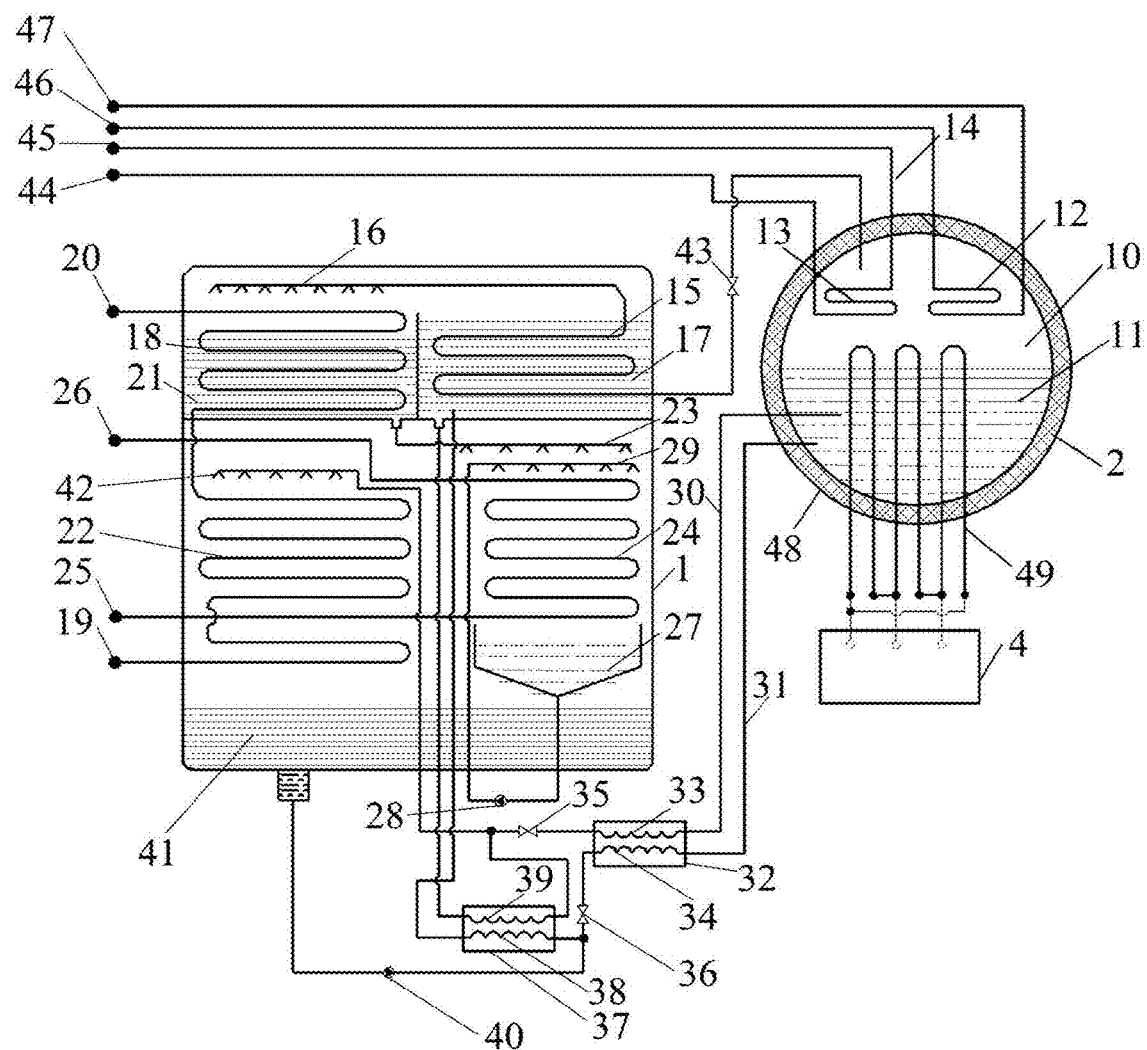
FIG. 2 is a schematic structural diagram of an electric lithium bromide absorption air conditioning unit with an electric heating tube according to an embodiment of the present disclosure.

FIG. 2 is a schematic structural diagram of an electric lithium bromide absorption air conditioning unit with an electric heating tube according to an embodiment of the present disclosure. FIG. 2 is essentially the same as FIG. 1, except that FIG. 1 adopts an electromagnetic induction heating method for heating, while FIG. 2 employs an electric heating tube resistance heating method to heat the electric heat generating cylinder 2 and the concentrated lithium bromide solution 11. Since the conventional electric heating tube method is well-known, it will not be discussed here.

Figure 3:
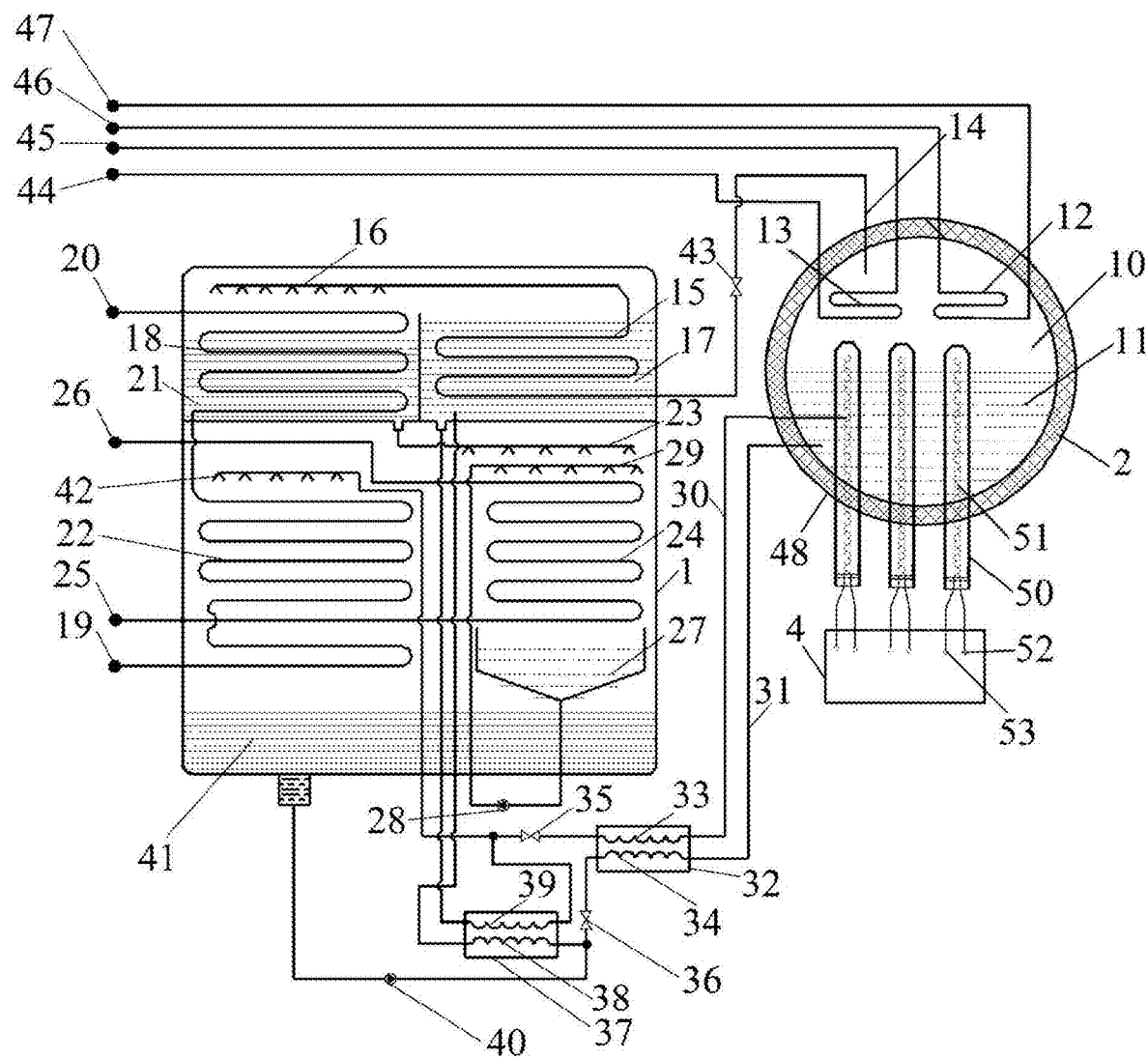
FIG. 3 is a schematic structural diagram of an electric lithium bromide absorption air conditioning unit with a carbon fiber heating tube according to an embodiment of the present disclosure.

FIG. 3 is a schematic structural diagram of an electric lithium bromide absorption air conditioning unit with a carbon fiber heating tube according to an embodiment of the present disclosure. FIG. 3 shows one or more quartz glass tube 50, a carbon fiber heating wire 51, a third power supply terminal 52 and a fourth power supply terminal 53.

The embodiment of FIG. 3 adopts one or more quartz glass tube 50, the carbon fiber heating wire 51, the third power supply terminal 52 and the fourth power supply terminal 53.

The carbon fiber heating wire 51 is made of fully woven carbon fiber infrared heating wire, which has a long lifespan of over 6000-8000 hours. The quartz glass tube 50 can be heated to 1100° C. and rapidly immersed in cold water without damage or malfunction. The carbon fiber heating wire 51 generates infrared heat with minimal visible light, and its electric-to-heat conversion efficiency exceeds 95%. Compared to heaters using materials such as nickel-chromium or tungsten-molybdenum as heating elements, it can save up to 30% in energy consumption.

Figure 4:
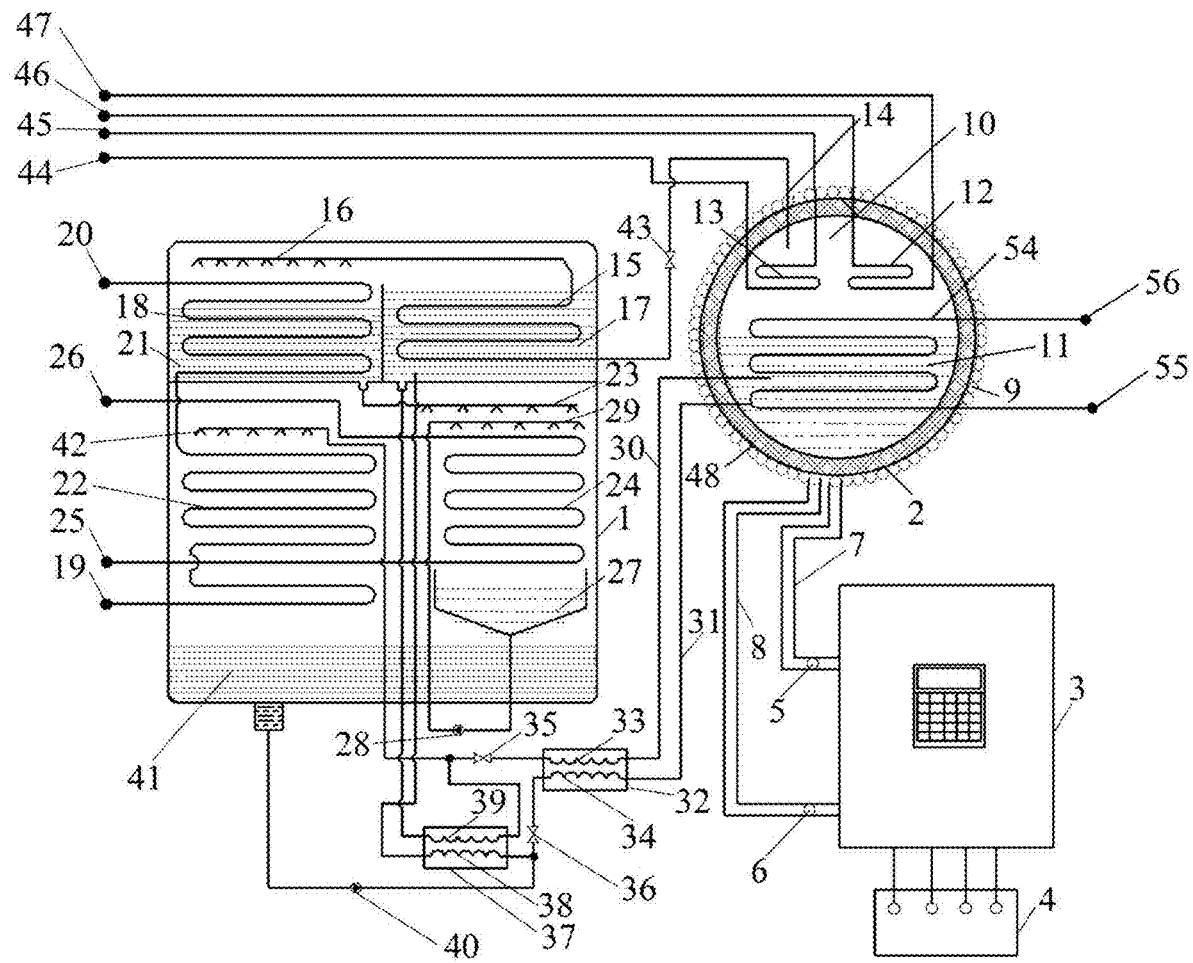
FIG. 4 a schematic structural diagram of an electric lithium bromide absorption air conditioning unit according to an embodiment of the present disclosure.

FIG. 4 a schematic structural diagram of an electric lithium bromide absorption air conditioning unit according to an embodiment of the present disclosure. As shown in FIG. 4, a energy storage and heat exchanging device 54 is installed in the concentrated lithium bromide solution 11 inside the electric heat generating cylinder 2. It is connected to an external heat storage device via the inputting interface of the energy storage and heat exchanging device 55 and output interface 56. By utilizing cheap off-peak electricity from the power grid for thermal storage, this system enables an energy-storage-based lithium bromide absorption air conditioning unit. This not only allows for low-cost air conditioning operation but also serves as an energy storage device on the customer side of the power grid.

Figure 5:
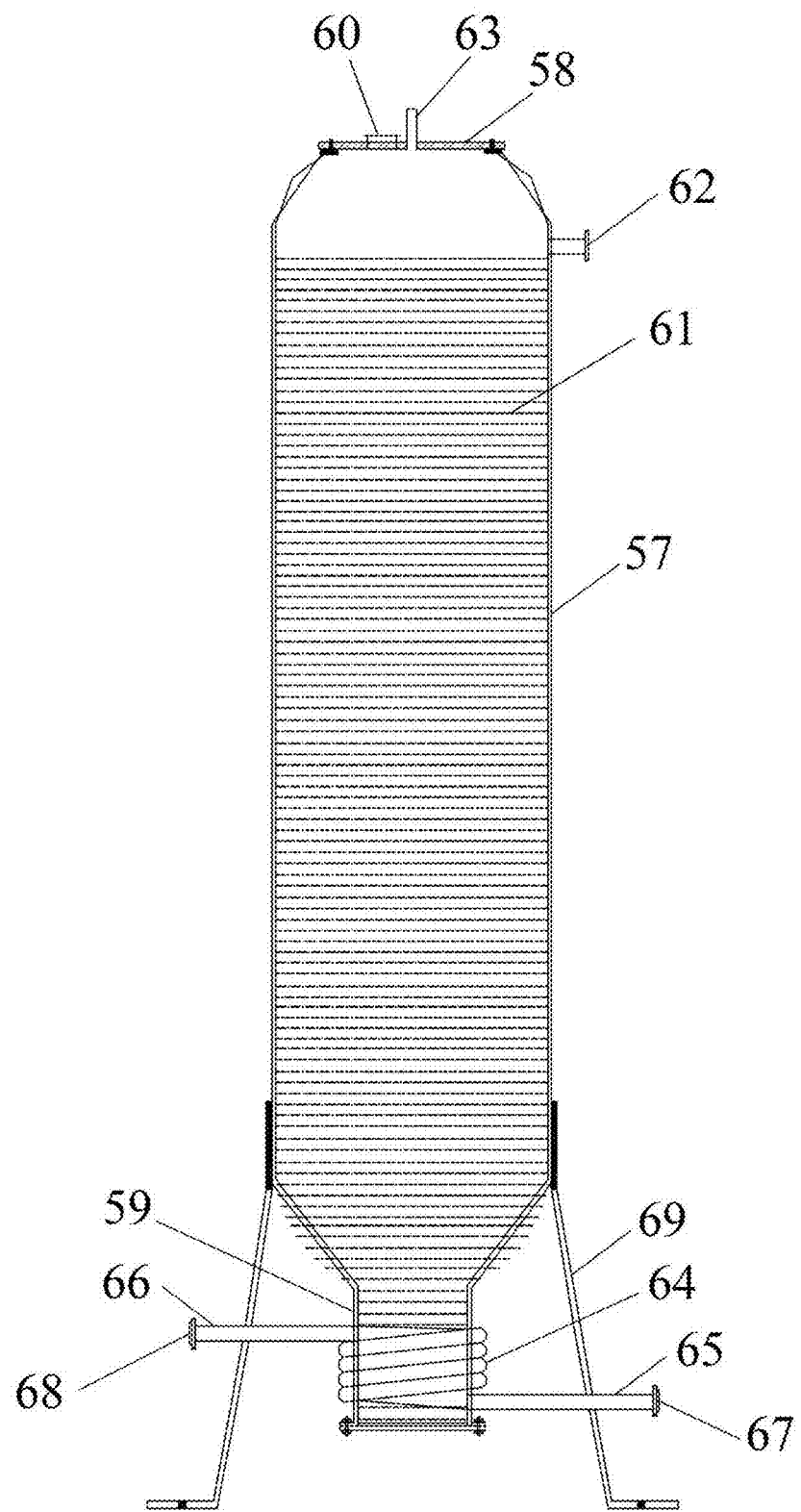
FIG. 5 is a schematic structural diagram of an electric heat storage device with an external lower heat exchanging coil according to an embodiment of the present disclosure.

FIG. 5 is a schematic structural diagram of an electric heat storage device with an external lower heat exchanging coil according to an embodiment of the present disclosure. As shown in FIG. 5, the electric heat storage device with external lower heat exchanging coil includes a heat storage and exchanging tank body 57, a filling hole 58, a thermal storage medium heat exchanging tube 59, a thermal storage medium feeding port 60, a thermal storage medium 61, an external lower heat exchanging coil 64, a heat exchanging medium inputting tube 65, and a heat exchanging medium outputting tube 66.

The thermal storage medium 61 is provided inside the heat storage and exchanging tank 57, the material should be selected based on whether the thermal storage medium 61 is corrosive and the thermal storage temperature. If the temperature exceeds 600° C., ferritic stainless steel should not be used to manufacture the electromagnetic induction heating tank, as ferritic stainless steel will lose its magnetism above 600° C., affecting the electromagnetic induction efficiency. Instead, martensitic or austenitic stainless steel materials should be used. The filling hole 58 serves as the access point for adding or maintaining the thermal storage material, and the thermal storage medium feeding port 60 is located above the filling hole 58. The thermal storage medium 61 is added by opening the thermal storage medium feeding port 60.

The thermal storage medium 61 can be water, oil, molten salt, liquid metal or rock sand. And choosing the thermal storage medium 61 according to aims and temperature.

As shown in FIG. 5, the external heat exchange coil 64 is arranged around the outside of the thermal storage medium heat exchanging tube 59. Through the close contact between the external heat exchanging coil 64 and the surface of the thermal storage medium heat exchanging tube 59, heat is transferred from the thermal storage medium 61 to the surface of the external heat exchanging coil 64. This heat is then transferred through the surface to the heating supply circulating medium inside the external heat exchanging coil 64. The heat transfer cycle is carried out through the heat exchanging medium inputting pipe 65 and outputting pipe 66, which are connected to the heating supply system interface via the heat exchanging and inputting interface 67 and heat exchanging and outputting interface 68. This process circulates and outputs the heat from the thermal storage medium 61, enabling the combined operation of energy storage and heat exchange for heating supply.

The observing mirror 62 is configured to observe the phase transition process of the thermal storage medium 61. The thermal storage tank bracket 69 should ensure the load-bearing capacity of the heat storing and exchanging tank 57 and ensure safe operation.

It should be noted that, the external lower heat exchanging coil of an electric heat storage device shown in FIG. 5 can be used as an independent energy storage heating device in heating systems. It can also be combined with the energy storage and heat exchanging device 54 shown in FIG. 4, connecting the heat exchanging and inputting interface 67 and heat exchanging and outputting interface 68 through the inputting interface of the energy storage and heat exchanging device 55 and outputting interface 56. This allows the circulating heat transfer medium to transfer the stored heat in FIG. 5 to the energy storage and heat exchanging device 54.

Figure 6:
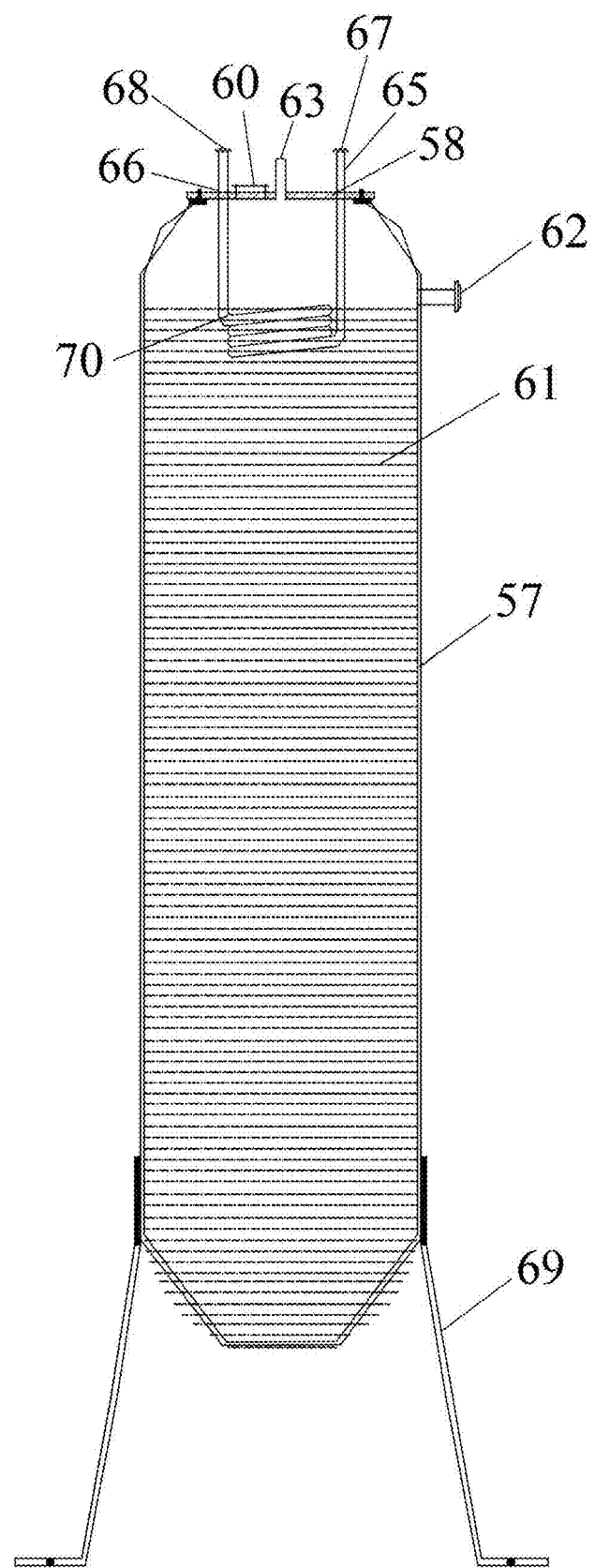
FIG. 6 is a schematic structural diagram of an electric heat storage device with a built-in heat exchanging coil according to an embodiment of the present disclosure.

FIG. 6 is a schematic structural diagram of an electric heat storage device with a built-in heat exchanging coil according to an embodiment of the present disclosure. The electric heat storage device with built-in heat exchanging coil including the heat storage and exchange transfer tank 57, the filling hole 58, the thermal storage medium feeding port 60, the thermal storage medium 61, a tank atmospheric pressure breathing interface 63, the heat exchanging medium inputting pipe 65, the heat exchanging medium outputting pipe 66, and a built-in upper heat exchanging coil 70;

As shown in FIG. 6, at least one or more circles of the built-in upper heat exchanging coil 70 is immersed in the thermal storage medium 61 or suspended above the thermal storage medium 61, the heat exchanging medium inputting pipe 65 and the heat exchanging medium outputting pipe 66 are fixed above the filling hole 58 or the heat storage and exchanging tank body 57.

FIG. 6 shows an arrangement based on FIG. 5, where THE built-in upper heat exchanging coil 70 is fixedly installed above the filling hole 58. This configuration offers many benefits and conveniences for practical applications. Other functions are essentially the same as those in FIG. 5.

The tank atmospheric pressure breathing interface 63 is configured to enhance the safety of the heat storage and exchange transfer tank 57. When the heat storage and exchange transfer tank 57 expands, the breathing interface 63 releases gas and pressure to the outside. When the heat storage and exchange transfer tank 57 forms a negative pressure state, the tank atmospheric pressure breathing interface 63 draws air from the outside, ensuring that the heat storage and exchange transfer tank 57 always operates at a stable and reliable normal pressure. To ensure the cleanliness of the tank, the tank atmospheric pressure breathing interface 63 can be equipped with a conventional breather, utilizing an air filter within the breather to filter out impurities from the incoming air.

Figure 7:
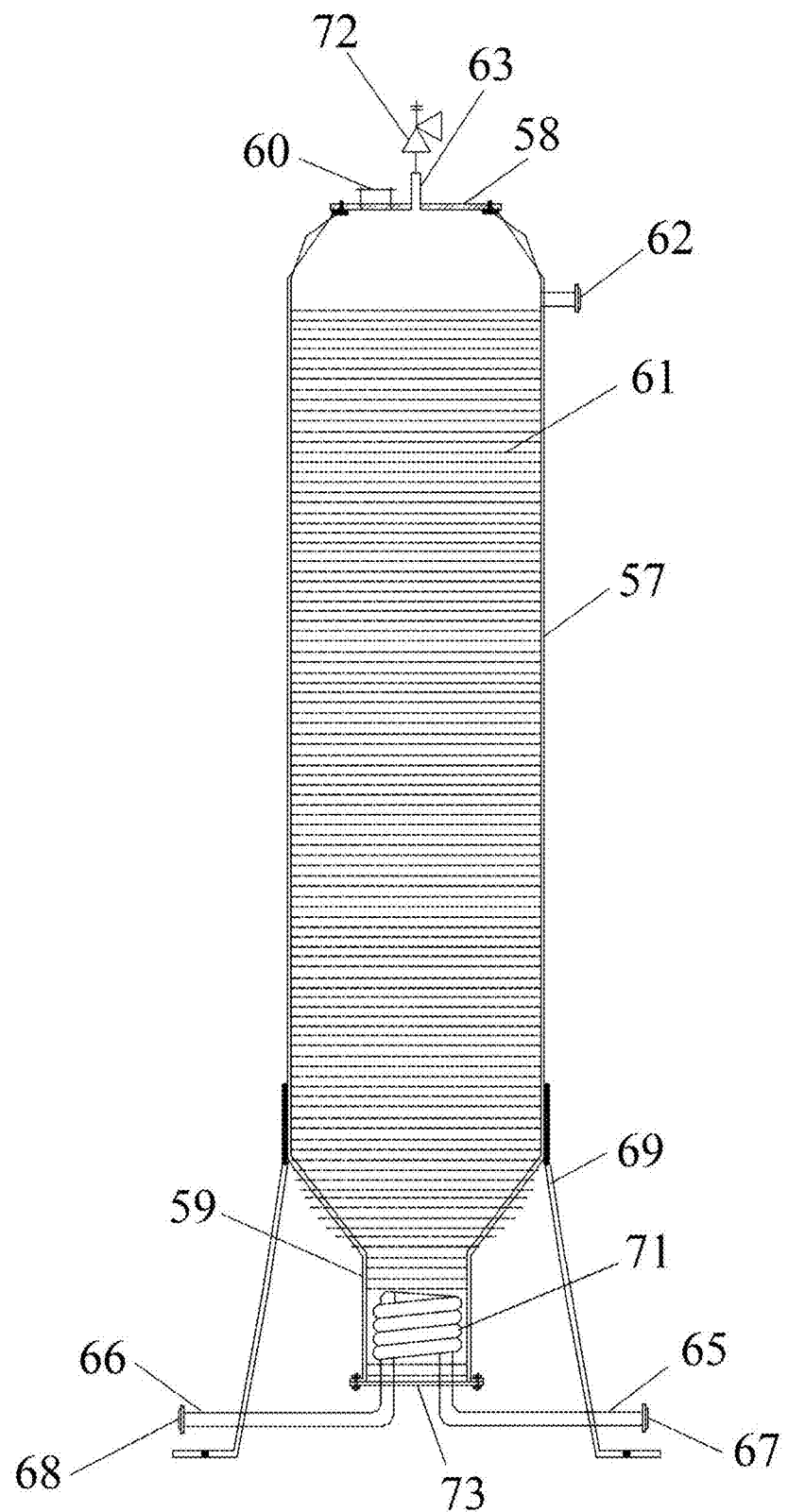
FIG. 7 is a schematic structural diagram of a built-in lower heat exchanging coil and the discharging of thermal storage medium according to an embodiment of the present disclosure.

FIG. 7 is a schematic structural diagram of a built-in lower heat exchanging coil and the discharging of thermal storage medium according to an embodiment of the present disclosure. The electric heat storage device includes the heat storage and exchanging tank body 57, the filling hole 58, the thermal storage medium feeding port 60, the thermal storage medium 61, the tank atmospheric pressure breathing interface 63, the heat exchanging medium inputting pipe 65, the heat exchanging medium outputting pipe 66, a built-in lower heat exchanging coil 71, a breathing valve 72, a thermal storage medium discharge plate 73.

At least one or more circles of the built-in lower heat exchanging coil 71 is immersed in the thermal storage medium 61, the heat exchanging medium inputting pipe 65 and the heat exchanging medium outputting pipe 66 are disposed above the heat exchanging cartridge 59 or the thermal storage medium discharge blocking plate 73.

The breathing valve 72 is disposed above the tank atmospheric pressure breathing interface 63 and connected with the heat storage and exchanging tank body 57, served as a atmospheric pressure breathing device of the heat storage and exchanging tank body 57.

The breathing valve 72 can also adopt a conventional breather, as conventional breathers do not have a check valve and are only equipped with an air filter to prevent air impurities from entering the tank. Since this disclosure is for high-temperature thermal storage, the air filter within the breather should be a high-temperature resistant metal air filter.

Figure 8:
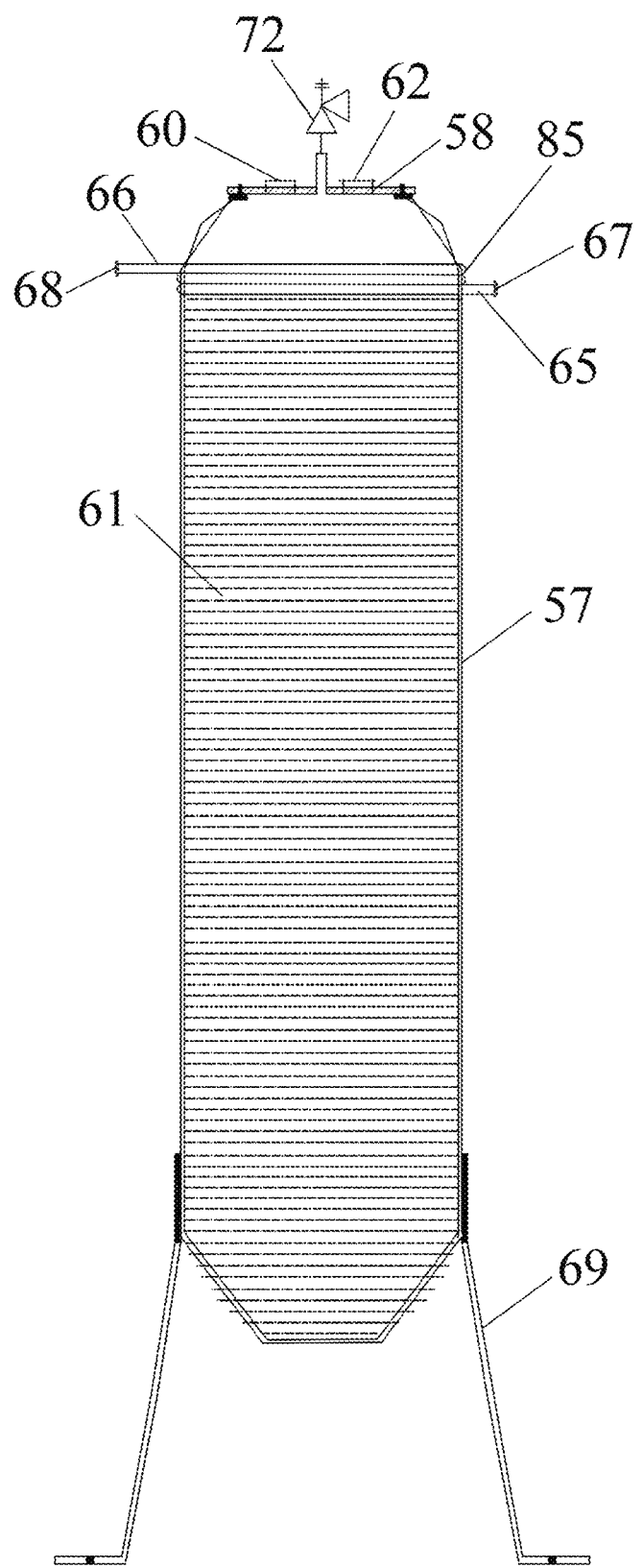
FIG. 8 is a schematic structural diagram of an electric heat storage device with an external upper heat exchanging coil according to an embodiment of the present disclosure.

FIG. 8 is a schematic structural diagram of an electric heat storage device with an external upper heat exchanging coil according to an embodiment of the present disclosure. The electric heat storage device with an external upper heat exchanging coil includes the heat storage and exchanging tank body 57, the filling hole 58, the thermal storage medium feeding port 60, the thermal storage medium 61, the tank atmospheric pressure breathing interface 63, the heat exchanging medium inputting pipe 65, the heat exchanging medium outputting pipe 66, an external upper heat exchanging coil 85, and the breathing valve 72.

As shown in FIG. 8, at least one or more circles of the external upper heat exchanging coil 85, or at least one or more rings of the external upper heat exchanging coil 85 are disposed outside the heat storage and exchanging tank body 57. In addition, the other components are the same with that of FIG. 5.

Figure 9:
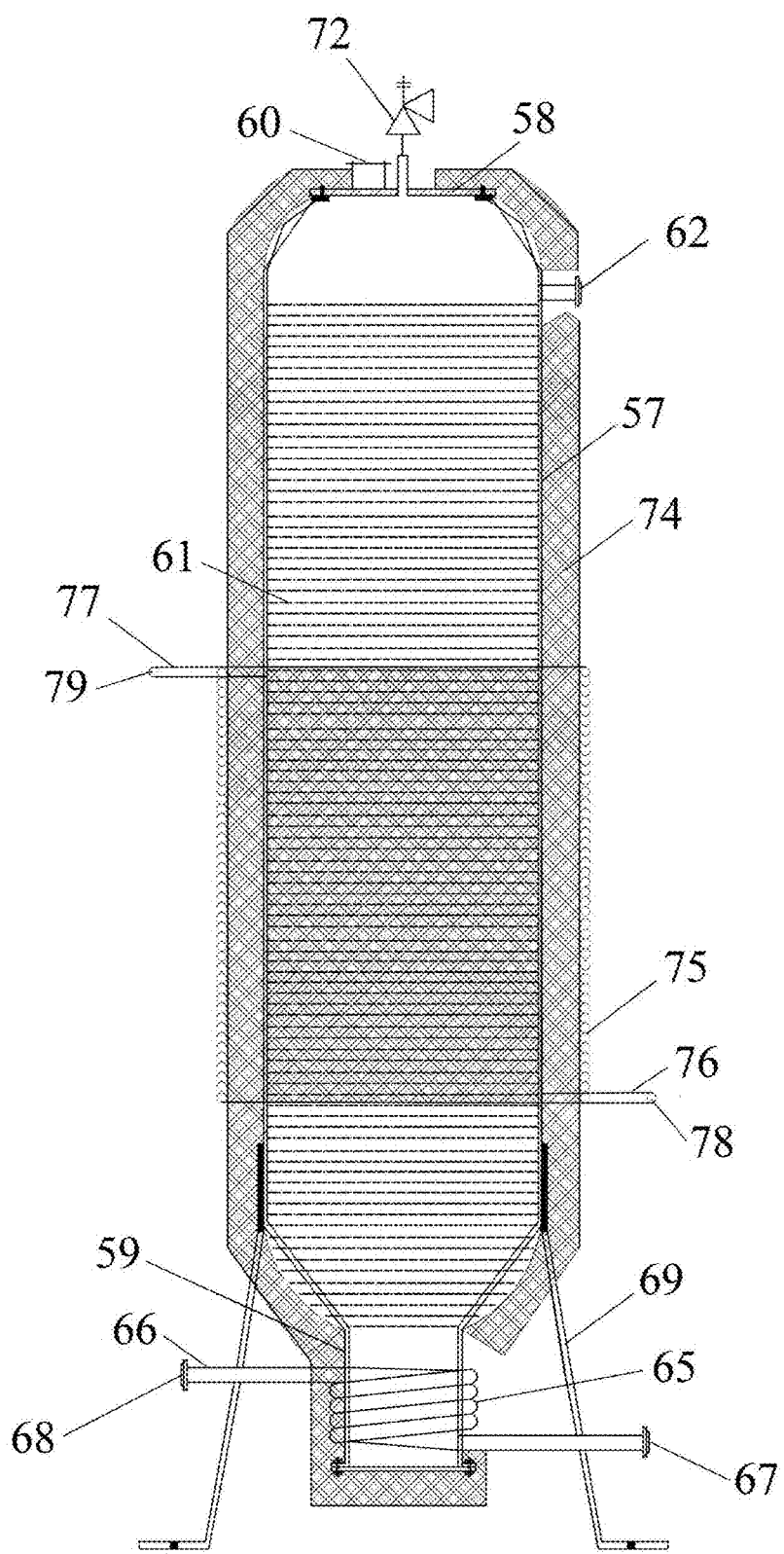
FIG. 9 is a schematic structural diagram of an energy storage refrigeration and heating system with electromagnetic induction heating according to an embodiment of the present disclosure.

FIG. 9 is a schematic structural diagram of an energy storage refrigeration and heating system with electromagnetic induction heating according to an embodiment of the present disclosure. The energy storage refrigeration and heating system with electromagnetic induction heating includes heat storing and exchanging tank 57, the filling hole 58, the thermal storage medium heat exchanging tube 59, the thermal storage medium feeding port 60, the thermal storage medium 61, the tank atmospheric pressure breathing interface 63, the external lower heat exchanging coil 64, the heat exchanging medium inputting tube 65, the heat exchanging medium outputting tube 66, the breathing valve 72, a second thermal insulation material 74, at least one set of electromagnetic induction heating coil 75, a first electromagnetic induction coil lead 76, and a second electromagnetic induction coil lead 77.

As shown in FIG. 9, the second thermal insulation material 74 is uniformly wrapped on the outer surfaces of the heat storing and exchanging tank 57, the external lower heat exchanging coil 64, the heat exchanging medium inputting pipe 65 and the heat exchanging medium 66.

Further, the electromagnetic induction heating coil 75 is wound around the outside of the second thermal insulation material 74, served as a heating device for the heat storing and exchanging tank 57, the purpose is to heat the thermal storage medium 61 through the heat storing and exchanging tank 57.

In addition to being connected to the thermal energy storage and heat exchanging device 54 in FIG. 4 to form a thermally energy-stored lithium bromide refrigeration air conditioning system, FIG. 9 can also independently serve as a winter heating system, acting as a heat source for residential or commercial winter thermal energy storage heating systems.

Figure 10:
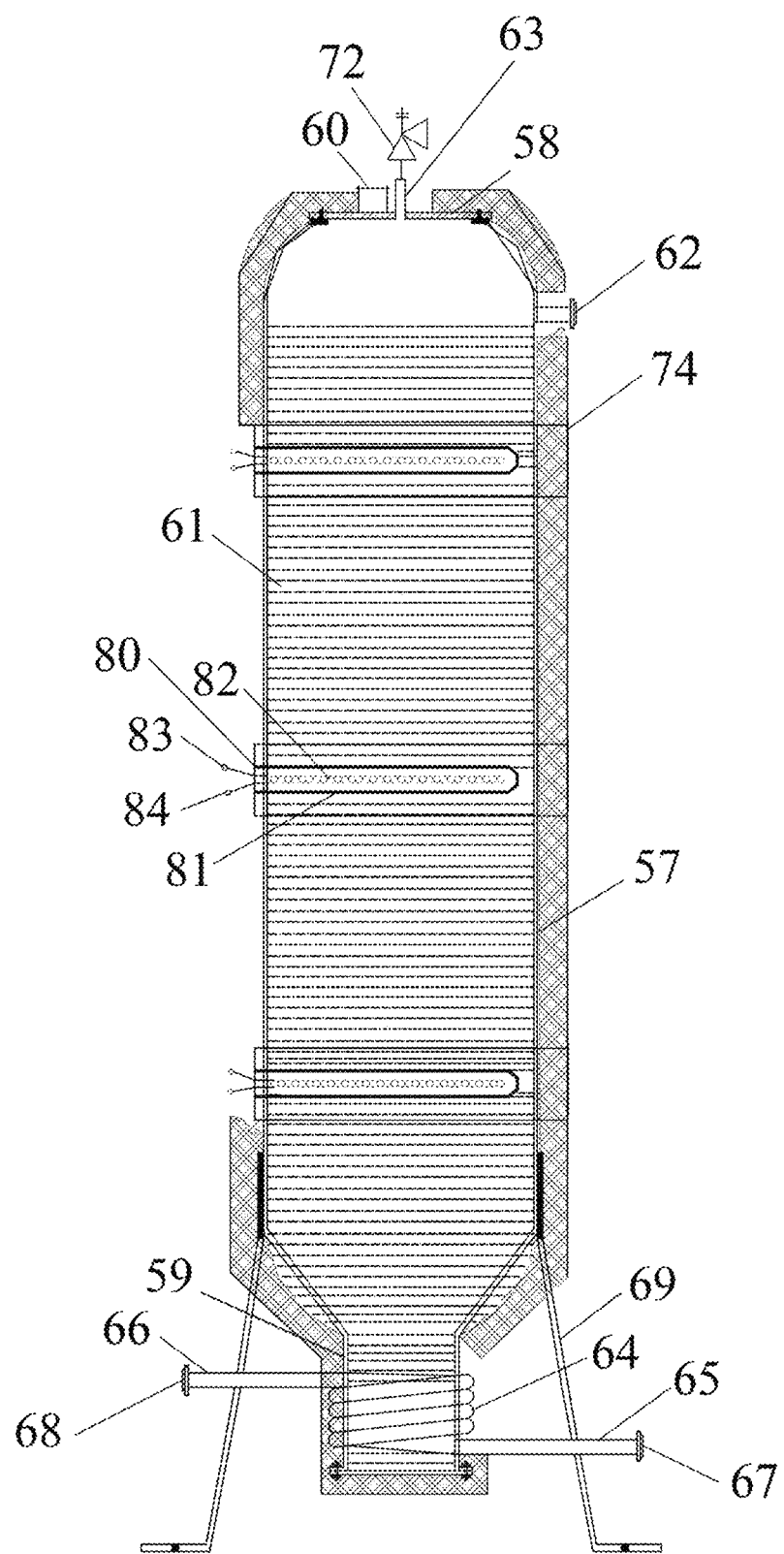
FIG. 10 is a schematic structural diagram of an energy storage refrigeration and heating system with electric heating according to an embodiment of the present disclosure.

FIG. 10 is a schematic structural diagram of an energy storage refrigeration and heating system with electric heating according to an embodiment of the present disclosure. The energy storage refrigeration and heating system with electric heating includes the heat storing and exchanging tank 57, the filling hole 58, thermal storage medium 59, the thermal storage medium feeding port 60, the thermal storage medium 61, the tank atmospheric pressure breathing interface 63, the external lower heat exchanging coil 64, the heat exchanging medium inputting tube 65, the heat exchanging medium outputting tube 66, the breathing valve 72, the second insulation material 74, a carbon fiber heating tube 80, a quartz glass tube 81, and a carbon fiber heating wire 82.

As shown in FIG. 10, the carbon fiber heating tube 80 is disposed in the heat storing and exchanging tank body 57 and immersed in the thermal storage medium 61.

In addition to being connected to the energy storage and heat exchanging device 54 in FIG. 4 to form a thermally energy-stored lithium bromide refrigeration air conditioning system, FIG. 10 can also independently function as a winter heating system, serving as a heat source for residential or commercial winter thermal energy storage heating systems.

Figure 11:
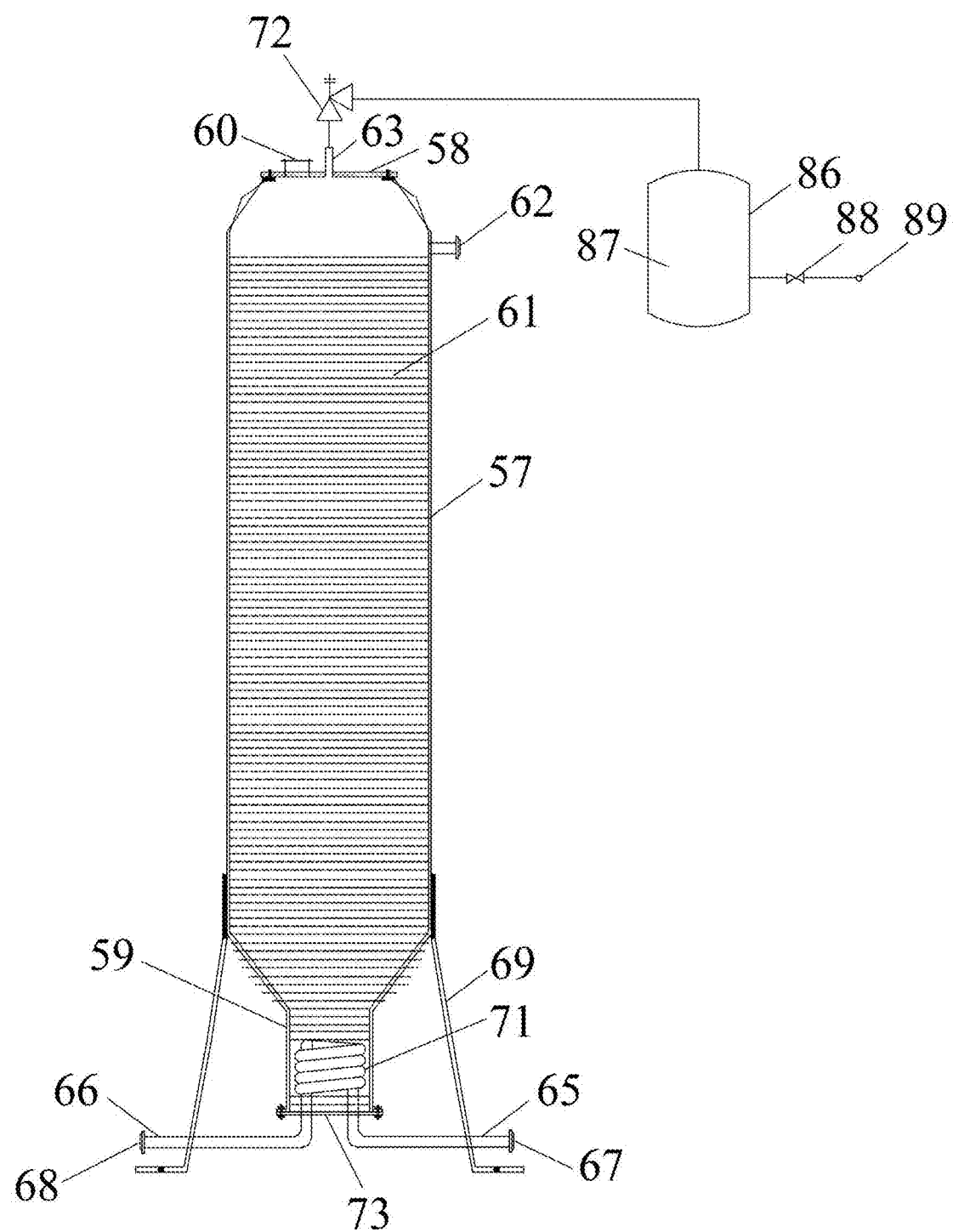
FIG. 11 is a schematic structural diagram of an energy storage refrigeration and heating system with a breathing valve and nitrogen according to an embodiment of the present disclosure.

FIG. 11 is a schematic structural diagram of an energy storage refrigeration and heating system with a breathing valve and nitrogen according to an embodiment of the present disclosure. The energy storage refrigeration and heating system with a breathing valve and nitrogen includes the heat storing and exchanging tank 57, the filling hole 58, the thermal storage medium heat feeding port 60, the thermal storage medium 61, an observing mirror 62, the tank atmospheric pressure breathing interface 63, the external lower heat exchanging coil 64, the heat exchanging medium inputting pipe 65, the heat exchanging medium outputting pipe 66, the breathing valve 72, a nitrogen tank 86, and nitrogen 87.

As shown in FIG. 11, the breathing valve 72 is connected to the heat storage and exchanging tank body 57 through the tank atmospheric pressure breathing interface 63, and connected with the thermal storage medium 61; an end of the breathing valve 72 is communicated with air, another end of the breathing valve 72 is connected with the nitrogen tank 86 and communicated with the nitrogen 87; the observing mirror 62 is disposed on the heat storage and exchanging tank body 57 or the filling hole 58, and configured to observe the location of the thermal storage medium 61.

Figure 12:
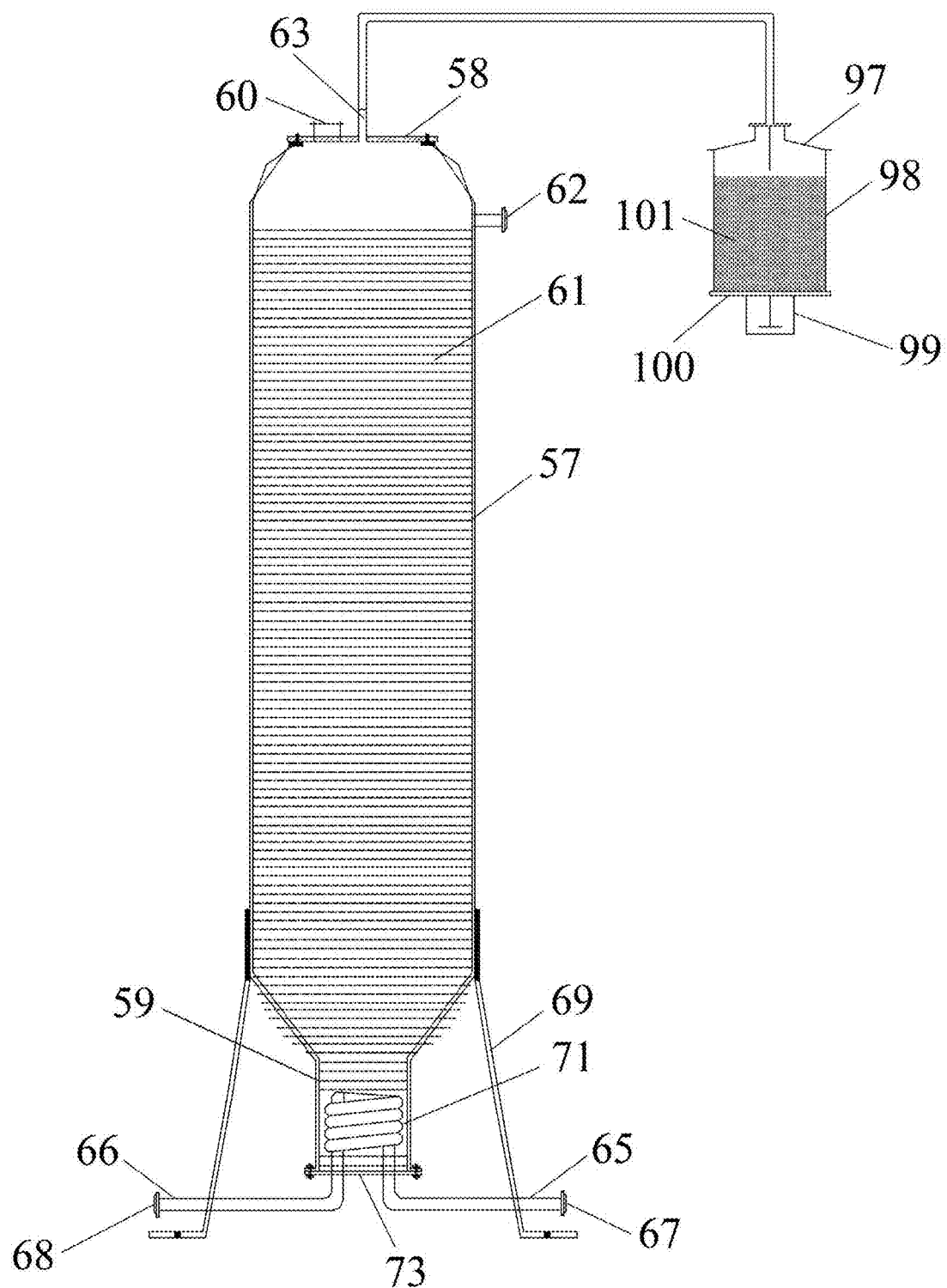
FIG. 12 is a schematic structural diagram of an energy storage refrigeration and heating system with a silicone breathing apparatus according to an embodiment of the present disclosure.

FIG. 12 is a schematic structural diagram of an energy storage refrigeration and heating system with a silicone breathing apparatus according to an embodiment of the present disclosure. The energy storage refrigeration and heating system with a silicone breathing apparatus includes heat storage heat exchanging tank 57, filling manhole 58, thermal storage medium heat exchanging tube 59, thermal storage medium feeding port 60, thermal storage medium 61, observing mirror 62, tank atmospheric pressure breathing interface 63, external heat exchanging coil 64, heat exchanging medium inputting pipe 65, the heat exchanging medium outputting pipe 66, the breathing valve 72, a silicone breathing apparatus 97, a silica gel color glass cover 98, an oil seal glass 99, a breathing hole 100, and silica gel 101.

As shown in FIG. 12, the silicone breathing apparatus 97 is connected to the heat storage and exchanging tank 57 through the tank atmospheric pressure breathing interface 63, and communicated with the thermal storage medium 61; the silicone breathing apparatus 97 is provided with the silicone 101, the thermal storage medium 61 is communicated with the air through the breathing hole 100, and passed through the silica gel 101 and the oil sealing glass 99 and the, serving as a breathing channel of the heat storage heat exchanging tank 57.

A high-temperature oil, such as thermal oil, is placed inside the oil seal sealing glass 99. The purpose is to use the oil as a medium to isolate the silicone gel 101 from the atmosphere, preventing the silicone breathing apparatus 97 from being in continuous contact with the air. This helps avoid contamination of the silica gel 101 by moisture and impurities in the air.

Figure 13:
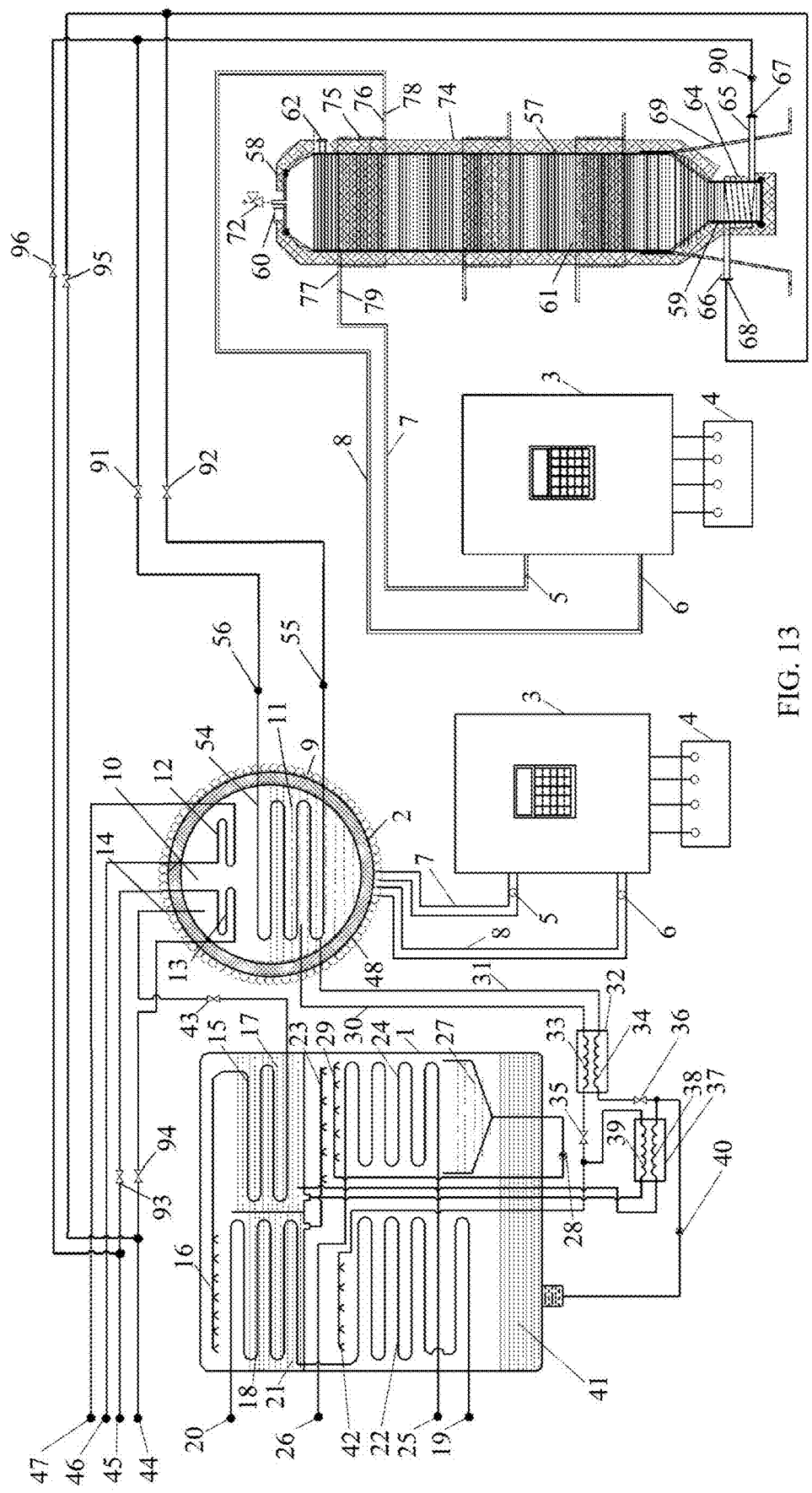
FIG. 13 is an electric lithium bromide absorption air conditioning unit and an energy storage refrigeration and heating system with electromagnetic induction heating according to an embodiment of the present disclosure.

FIG. 13 is an electric lithium bromide absorption air conditioning unit and an energy storage refrigeration and heating system with electromagnetic induction heating according to an embodiment of the present disclosure. The electric lithium bromide absorption air conditioning unit and an energy storage refrigeration and heating system includes electromagnetic induction high frequency generator 3, the grid power supply 4, a first electromagnetic induction high frequency current outputting interface 5, a second electromagnetic induction high frequency current outputting interface 6, a first electromagnetic induction high frequency current outputting cable 7, a second electromagnetic induction high frequency current outputting cable 8, the energy storage and heat exchanging device 54, the heat storage heat exchanging tank 57, the external lower heat exchanging coil 64, a heat exchanging and inputting interface 67, a heat exchanging and outputting interface 68, the electromagnetic induction heating coil 75, a heat storage circulating pump 90, a fourth energy storage cooling and heating conversion valve 91, a fifth energy storage cooling and heating conversion valve 92, a sixth energy storage cooling and heating changing valve 93, a seventh energy storage cooling and heating conversion valve 94, a eighth energy storage cooling and heating conversion valve 95, a ninth energy storage cooling and heating conversion valve 96.

As shown in FIG. 13, an end of the energy storage and heat exchanging device 54 is connected with the heating outputting valve 45, another end is connected to an end of the external lower heat exchanging coil 64 through the heat storage circulating pump 90 and the heat exchanging and inputting interface 67; and the other end of the external lower heat exchanging coil 64 is connected to the energy storage and heating device 54 through the fifth energy storage cooling and heating conversion valve 92 and an inputting interface of the energy storage and heat exchanging device 55; and an other end is connected with an energy storage cooling and heating inputting interface 44 through the seventh energy storage cooling and heating conversion valve 94 and eighth energy storage cooling and heating conversion valve 95.

An end of the electromagnetic induction coil 75 is connected with the electromagnetic induction high frequency generator 3 by the first electromagnetic induction coil lead 76 and the second electromagnetic induction high frequency current outputting cable 8, and passing through a first power connecting terminal 78 of an electromagnetic induction heating controller and the second electromagnetic induction high frequency current outputting interface 6. Another end of the electromagnetic induction coil 75 is connected with the electromagnetic induction high frequency generator 3 by the first electromagnetic induction high frequency current outputting cable 7, and passing through the second electromagnetic induction coil lead 77 and the electromagnetic induction high frequency current outputting interface 5. The electromagnetic induction high frequency generator 3 is connected to the grid power supply 4.

The heat storage heat exchanging tank 57 converts wind, photovoltaic power generation, and off-peak electricity from the grid into heat and stores it in the thermal storage medium 61. During peak electricity periods, energy is discharged from the storage system via the heat storage heat exchanging tank 57 and the energy storage and heat exchanging device 54 to supply heat to the electric heat generator 10, forming a thermal energy storage lithium bromide absorption air conditioning unit for the summer cooling system. In winter, the heat storage heat exchanging tank 57 forms part of the energy storage heating supply system. Additionally, the first cooling and heating conversion valve 35, the second cooling and heating conversion valve 36, and the third cooling and heating conversion valve 43 can be used to form a conventional heating and hot water supply system. Since this is a conventional lithium bromide unit heating system, it will not be further discussed.

Figure 14:
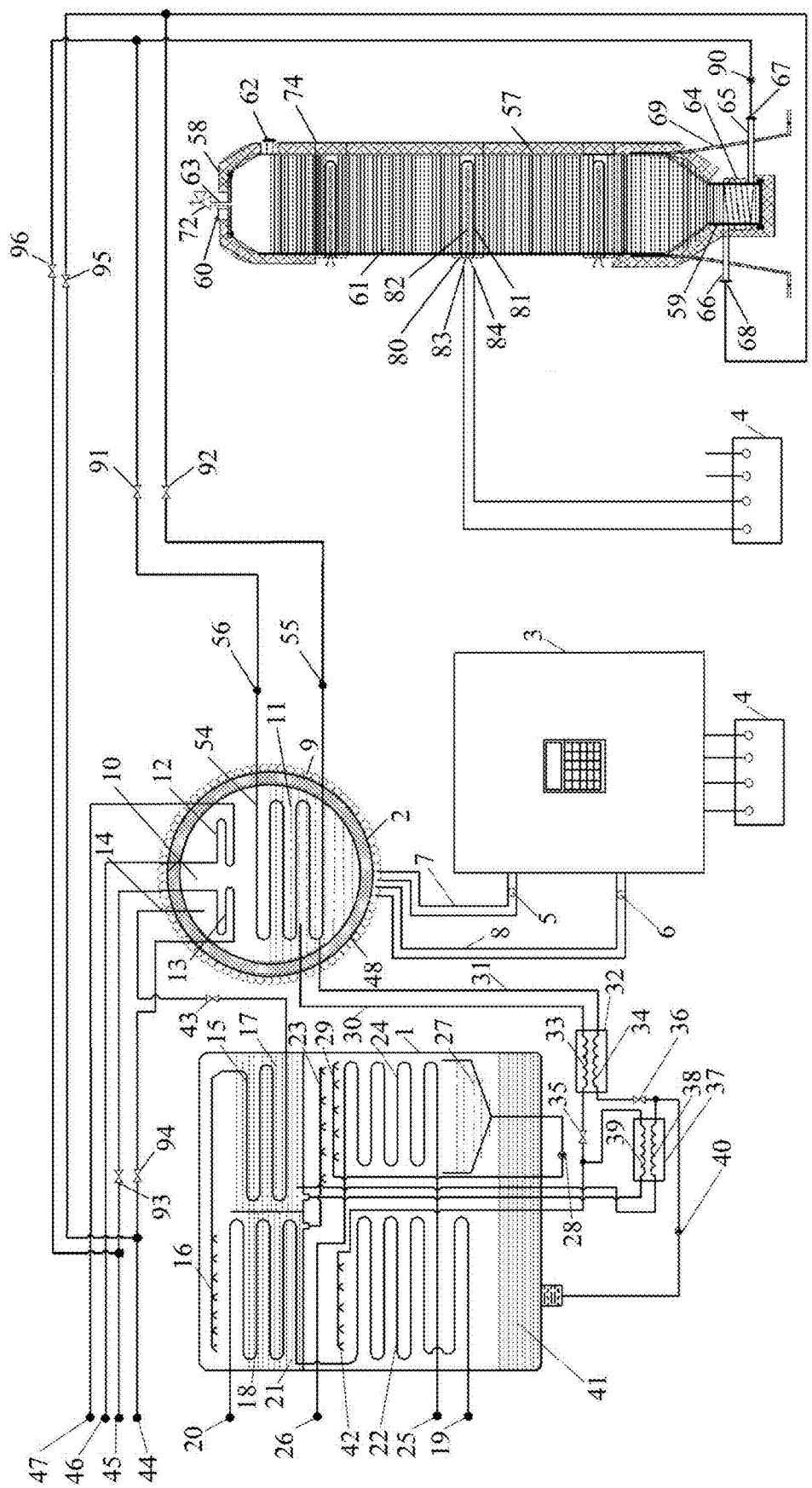
FIG. 14 is an electric lithium bromide absorption air conditioning unit and an energy storage refrigeration and heating system with the carbon fiber heating tube according to an embodiment of the present disclosure.

FIG. 14 is an electric lithium bromide absorption air conditioning unit and an energy storage refrigeration and heating system with the carbon fiber heating tube according to an embodiment of the present disclosure. The electric lithium bromide absorption air conditioning unit and an energy storage refrigeration and heating system with the carbon fiber heating tube includes the heat storage heat exchanging tank 57, the external lower heat exchanging coil 64, the carbon fiber heating pipe 80, the carbon fiber heating wire 82, a first power supply terminal 83, a second power supply terminal 84, and the heat storage circulating pump 90.

As shown in FIG. 14, the carbon fiber heating wire 82 of the carbon fiber heating pipe 80 is connected to the grid power supply 4 through the first power supply terminal 83 and the second power supply terminal 84, to obtain the power supply system of the carbon fiber heating pipe 80.

The external lower heat exchanging coil 64 of the heat storage heat exchanging tank 57 is connected to the energy storage heating heat exchanger 54, through the heat exchanging and inputting interface 67, the heat exchanging and outputting interface 68 and the heat exchanging circulating pump 90. It forms an independent winter heating system. This allows for heating in winter without going through the lithium bromide system, helping to extend the lifespan of the lithium bromide system.

The energy storage air conditioning system in FIG. 14 is the same as the energy storage heating system in FIG. 13, except that the heating method is different. The process will not be repeated here.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. An electric lithium bromide absorption air conditioning unit and an energy storage refrigeration and heating system, comprising:
    an electric heat generator (10), wherein the electric heat generator (10) comprises an electric heating device (102), a heat exchange coil (54) and a grid power supply (4), and wherein the electric heating device is connected to the grid power supply (4); and
    a heat storing and exchanging tank (57) connected to the heat exchange coil (54);
    the system further comprising a lithium bromide air conditioning unit body (1), an electric heat generating cylinder (2), concentrated lithium bromide solution (11), a domestic hot water heat exchanger (12), a heating heat exchanger (13), a refrigerant steam outputting tube (14), a cryogenerator (15), a refrigerant steam spraying device (16), cryogenerator dilute solution (17), a condenser (18), cryogenerator refrigerant water (21), an absorption heat exchanger (22), a cryogenerator refrigerant water spraying device (23), an evaporator (24), evaporator refrigerant water (27), an evaporator refrigerant water spray pump (28), an evaporator refrigerant water spraying device (29), a concentrated solution outputting pipe (30), a dilute solution inputting tube (31), a high temperature heat exchanger (32), a high temperature primary side heat exchanging rod (33), a high temperature secondary side heat exchanging rod (34), a first cooling and heating conversion valve (35), a second cooling and heating conversion valve (36), a low temperature heat exchanger (37), a low temperature heat first heat exchanging rod (38), low temperature second heat exchanging rod (39), an absorption liquid outputting pump (40), absorber dilute solution (41), a concentrated solution spraying device (42), a third cooling and heating conversion valve (43), and first thermal insulation material (48);
    wherein a lower part of the electric heat generating cylinder (2) is provided with the concentrated lithium bromide solution (11), the domestic hot water heat exchanger (12), the heating heat exchanger (13) and the refrigerant steam outputting tube (14) are disposed at an upper part of the heat generator (10);

wherein the electric heating device comprises an electromagnetic induction high frequency generator (3), a first electromagnetic induction high frequency current outputting cable (7), a second electromagnetic induction high frequency current outputting cable (8), and a first electromagnetic induction heating coil (9), wherein the electromagnetic induction high frequency generator (3) is connected to the first electromagnetic induction heating coil (9) by the first electromagnetic induction high frequency current outputting cable (7) and the second electromagnetic induction high frequency current outputting cable (8);

wherein the electric heat generating cylinder (2) is wrapped with the first thermal insulation material (48), and the first thermal insulation material (48) is externally wrapped with at least one set of the first electromagnetic induction heating coil (9);

wherein the concentrated lithium bromide solution (11) is connected to the concentrated solution spraying device (42) through the high temperature heat exchanger (32) and the high temperature primary side heat exchanging rod (33); and the first cooling and heating conversion valve (35) are communicated with cryogenerator dilute solution (17) through the low temperature heat exchanger (37) and the low temperature heat first heat exchanging rod (38); and wherein the refrigerant steam outputting tube (14) is connected to the refrigerant steam spraying device (16) through the third cooling and heating conversion valve (43) and the cryogenerator (15);

wherein the cryogenerator refrigerant water spraying device (23) is connected to the cryogenerator refrigerant water (21);

wherein the evaporator refrigerant water spraying device (29) connects the evaporator refrigerant water (27) through the evaporator refrigerant water spray pump (28);

wherein the absorber dilute solution (41) is configured to be divided into two paths through the absorption liquid outputting pump (40): the absorber dilute solution (41) is communicated with the low temperature generator dilute solution (17) through the low temperature second heat exchanging rod (39) of the low temperature heat exchanger (37); and the absorber dilute solution (41) is communicated with the concentrated lithium bromide solution (11) through the second cooling and heating conversion valve (36), the high temperature heat exchanger (32) and the high temperature secondary side heat exchanging rod (34); and wherein the heat exchange coil (54) is disposed within the electric heat generator (10) and immersed in the concentrated lithium bromide solution (11); and the heat exchange coil (54) is set below the domestic hot water heat exchanger (12), the heating heat exchanger (13) and the refrigerant steam outputting tube (14); and the system further comprising a first electromagnetic induction high frequency current outputting interface (5), a second electromagnetic induction high frequency current outputting interface (6), an external lower heat exchanging coil (64), a heat exchanging and inputting interface (67), a heat exchanging and outputting interface (68), a second electromagnetic induction heating coil (75), a heat storage circulating pump (90), a fourth energy storage cooling and heating conversion valve (91), a fifth energy storage cooling and heating conversion valve (92), a sixth energy storage cooling and heating changing valve (93), a seventh energy storage cooling and heating conversion valve (94), an eighth energy storage cooling and heating conversion valve (95), a ninth energy storage cooling and heating conversion valve (96);

wherein an end of the heat exchange coil (54) is connected with a heating supply output interface (45) through an outputting interface (56) of the heat exchange coil, the fourth energy storage cooling and heating conversion valve, the ninth energy storage cooling and heating conversion valve and the sixth energy storage cooling and heating changing valve; and the end of the heat exchange coil is connected to an end of the external lower heat exchanging coil (64) through the heat storage circulating pump (90) and the heat exchanging and inputting interface (67); another end of the external lower heat exchanging coil (64) is connected to another end of the heat exchange coil (54) through the fifth energy storage cooling and heating conversion valve (92) and an inputting interface (55) of the heat exchange coil; and the other end of the external lower heat exchanging coil is connected with a heating supply input interface (44) through the eighth energy storage cooling and heating conversion valve (95) and the seventh energy storage cooling and heating conversion valve (94); and wherein one end of the second electromagnetic induction heating coil (75) is connected with the electromagnetic induction high frequency generator (3) by the first electromagnetic induction coil lead (76) and the second electromagnetic induction high frequency current outputting cable (8), and passing through a first power connecting terminal (78) of an electromagnetic induction heating controller and the second electromagnetic induction high frequency current outputting interface (6); and another end of the second electromagnetic induction heating coil (75) is connected with the electromagnetic induction high frequency generator (3) by the first electromagnetic induction high frequency current outputting cable (7), and passing through the second electromagnetic induction coil lead (77) and the electromagnetic induction high frequency current outputting interface (5); and the electromagnetic induction high frequency generator (3) is connected to the grid power supply (4).

2. The electric lithium bromide absorption air conditioning unit and an energy storage refrigeration and heating system according to claim 1, wherein the electric heating device comprises an electric heating tube (49);

the electric heating tube (49) is a metal resistance wire heating tube, a ceramic resistance heating tube or a silicon carbide resistance heating device; and the electric heating tube (49) is disposed within the electric heat generator (10) and immersed in the concentrated lithium bromide solution (11), and the electric heating tube (49) is set below the domestic hot water heat exchanger (12), the heating heat exchanger (13) and the refrigerant steam outputting tube (14).

3. The electric lithium bromide absorption air conditioning unit and an energy storage refrigeration and heating system according to claim 1, wherein the electric heating device comprises a carbon fiber electric heating tube (50);

the carbon fiber electric heating tube (50) is disposed in the heat generator (10) and immersed in the concentrated lithium bromide solution (11), and it is set below the domestic hot water heat exchanger (12), the heating heat exchanger (13) and the refrigerant steam outputting tube (14); and a carbon fiber heating wire (51) is provided inside the carbon fiber electric heating tube (50).

4. The electric lithium bromide absorption air conditioning unit and an energy storage refrigeration and heating system according to claim 1, further comprising, a filling hole (58), a thermal storage medium heat exchanging tube (59), a thermal storage medium feeding port (60), a thermal storage medium (61), a heat exchanging medium inputting tube (65), and a heat exchanging medium outputting tube (66);

wherein, the thermal storage medium (61) is provided inside the heat storage and exchanging tank (57), the thermal storage medium feeding port (60) is set above the filling hole (58); the thermal storage medium (61) is water, oil, molten salt, liquid metal or rock sand; and at least one or more circles of the external lower heat exchanging coil (64) is arranged outside the thermal storage medium heat exchanging tube (59), the external heat exchanging coil (64) and the thermal storage medium heat exchanging tube (59) form a close contacting outputting heat exchanger, the external heat exchanging coil (64) is connected to the heat circulation medium through the heat exchanging medium inputting tube (65) and the heat exchanging medium outputting tube (66), and the heat of the thermal storage medium (61) is outputting through the heat circulation medium.

5. The electric lithium bromide absorption air conditioning unit and an energy storage refrigeration and heating system according to claim 4, further comprising a tank atmospheric pressure breathing interface (63) and a built-in upper heat exchanging coil (70);

wherein, at least one or more circles of the built-in upper heat exchanging coil (70) is immersed in the thermal storage medium (61) or suspended above the thermal storage medium (61), the heat exchanging medium inputting tube (65) and the heat exchanging medium outputting tube (66) are fixed above the filling hole (58) or the heat storage and exchanging tank body (57).

6. The electric lithium bromide absorption air conditioning unit and an energy storage refrigeration and heating system according to claim 4, further comprising a tank atmospheric pressure breathing interface (63), a built-in lower heat exchanging coil (71), a breathing valve (72), a thermal storage medium discharge blocking plate (73);

wherein at least one or more circles of the built-in lower heat exchanging coil (71) is immersed in the thermal storage medium (61), the heat exchanging medium inputting pipe (65) and the heat exchanging medium outputting pipe (66) are disposed above the thermal storage medium heat exchanging tube (59) or the thermal storage medium discharge blocking plate (73); and the breathing valve (72) is disposed above the tank atmospheric pressure breathing interface (63) and connected with the heat storage and exchanging tank body (57).

7. The electric lithium bromide absorption air conditioning unit and an energy storage refrigeration and heating system according to claim 4, further comprising a tank atmospheric pressure breathing interface (63), an external upper heat exchanging coil (85), and a breathing valve (72);

wherein at least one or more circles of the external upper heat exchanging coil (85), or at least one or more rings of the external upper heat exchanging coil (85) are disposed outside the heat storage and exchanging tank body (57).

8. The electric lithium bromide absorption air conditioning unit and an energy storage refrigeration and heating system according to claim 4, further comprising a tank atmospheric pressure breathing interface (63), a breathing valve (72), a second thermal insulation material (74), at least one set of the second electromagnetic induction heating coil (75), a first electromagnetic induction coil lead (76), and a second electromagnetic induction coil lead (77);

wherein the second thermal insulation material (74) is uniformly wrapped on the outer surfaces of the heat storing and exchanging tank (57), the external lower heat exchanging coil (64), the heat exchanging medium inputting pipe (65) and the heat exchanging medium (66); and the second electromagnetic induction heating coil (75) is wound around the outside of the second thermal insulation material (74).

9. The electric lithium bromide absorption air conditioning unit and an energy storage refrigeration and heating system according to claim 4, further comprising a tank atmospheric pressure breathing interface (63), a breathing valve (72), a second thermal insulation material (74), a carbon fiber heating tube (80), a quartz glass tube (81), and a carbon fiber heating wire (82);

wherein, the carbon fiber heating tube (80) is disposed in the heat storing and exchanging tank body (57) and immersed in the thermal storage medium (61).

10. The electric lithium bromide absorption air conditioning unit and an energy storage refrigeration and heating system according to claim 4, further comprising an observing mirror (62), a tank atmospheric pressure breathing interface (63), a breathing valve (72), a nitrogen tank (86), and nitrogen (87);

wherein, the breathing valve (72) is connected to the heat storage and exchanging tank body (57) through the tank atmospheric pressure breathing interface (63), and connected with the thermal storage medium (61); an end of the breathing valve (72) is communicated with air, another end of the breathing valve (72) is connected with the nitrogen tank (86) and communicated with the nitrogen (87); the observing mirror (62) is disposed on the heat storage and exchanging tank body (57) or the filling hole (58), and configured to observe the location of the thermal storage medium (61).

11. The electric lithium bromide absorption air conditioning unit and an energy storage refrigeration and heating system according to claim 4, further comprising an observing mirror (62), a tank atmospheric pressure breathing interface (63), a breathing valve (72), a silicone breathing apparatus (97), a silica gel color glass cover (98), an oil seal glass (99), a breathing hole (100), and silica gel (101);

wherein, the silicone breathing apparatus (97) is connected to the heat storage and exchanging tank (57) through the tank atmospheric pressure breathing interface (63), and communicated with the thermal storage medium (61); the silicone breathing apparatus (97) is provided with the silicone (101), the thermal storage medium (61) is communicated with the air through the breathing hole (100), and passed through the silica gel (101) and the oil sealing glass (99) and the, serving as a breathing channel of the heat storage heat exchanging tank (57).

12. The electric lithium bromide absorption air conditioning unit and an energy storage refrigeration and heating system according to claim 9, wherein comprising grid power supply (4), the heat exchange coil (54), the heat storage heat exchanging tank (57), the external lower heat exchanging coil (64), the carbon fiber heating tube (80), the carbon fiber heating wire (82), a first power supply terminal (83), a second power supply terminal (84), and a heat storage circulating pump (90);

wherein, the carbon fiber heating wire (82) of the carbon fiber heating tube (80) is connected to the grid power supply (4) through the first power supply terminal (83) and the second power supply terminal (84); and the external lower heat exchanging coil (64) of the heat storage heat exchanging tank (57) is connected to the heat exchange coil (54), through the heat exchanging and inputting interface (67), the heat exchanging and outputting interface (68) and the heat exchanging circulating pump (90).

\* \* \* \* \*